(12) United States Patent
Jeong et al.

(10) Patent No.: US 8,183,303 B2
(45) Date of Patent: May 22, 2012

(54) ADHESIVE COMPOSITION AND ADHESIVE FILM MADE THEREFROM

(75) Inventors: Chul Ho Jeong, Gwangju (KR); Yi Yeol Lyu, Yongin-si (KR); Sun Jin Song, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 380 days.

(21) Appl. No.: 12/539,303

(22) Filed: Aug. 11, 2009

(65) Prior Publication Data

US 2010/0197821 A1    Aug. 5, 2010

(30) Foreign Application Priority Data

Feb. 3, 2009  (KR) .................. 10-2009-0008605

(51) Int. Cl.
*C08F 2/50* (2006.01)
*C08F 26/02* (2006.01)
*C08F 126/02* (2006.01)

(52) U.S. Cl. ............... 522/40; 522/42; 522/43; 522/44; 522/46; 522/55; 522/79; 522/173; 522/172; 522/117; 526/301

(58) Field of Classification Search ............. 522/79, 522/117, 173, 172, 40–46, 55; 526/301
See application file for complete search history.

(56) References Cited

U.S. PATENT DOCUMENTS

| | | | | |
|---|---|---|---|---|
| 4,902,727 A | * | 2/1990 | Aoki et al. | 522/90 |
| 4,999,271 A | * | 3/1991 | Etherington et al. | 430/284.1 |
| 5,185,417 A | * | 2/1993 | Takayama et al. | 526/301 |
| 6,653,375 B2 | * | 11/2003 | Moszner et al. | 524/116 |
| 7,105,207 B2 | * | 9/2006 | Warmkessel et al. | 427/516 |
| 7,264,873 B2 | * | 9/2007 | Katoh et al. | 428/355 AC |
| 7,419,564 B2 | * | 9/2008 | Henke et al. | 156/275.7 |
| 7,727,811 B2 | * | 6/2010 | Shintani et al. | 438/113 |
| 7,935,424 B2 | * | 5/2011 | Maeda et al. | 428/434 |
| 2008/0220251 A1 | | 9/2008 | Takaki | |
| 2010/0197876 A1 | * | 8/2010 | Lyu et al. | 526/317.1 |

FOREIGN PATENT DOCUMENTS

| | | |
|---|---|---|
| JP | 10-293201 | 4/1998 |
| JP | 2006-307197 | 9/2006 |
| KR | 1020050097979 A | 10/2005 |

* cited by examiner

*Primary Examiner* — Susan W Berman
(74) *Attorney, Agent, or Firm* — Cantor Colburn LLP

(57) ABSTRACT

Disclosed is an adhesive composition including a compound having a multi-functional urethane (meth)acrylate group and an adhesive film prepared by using it. The adhesive composition includes compounds represented by Chemical Formulae 1 to 3. The compound represented by Chemical Formulae 1 to 3 includes an urethane (meth)acrylate group represented by the Chemical Formula 1-1 or 1-2.

24 Claims, 1 Drawing Sheet

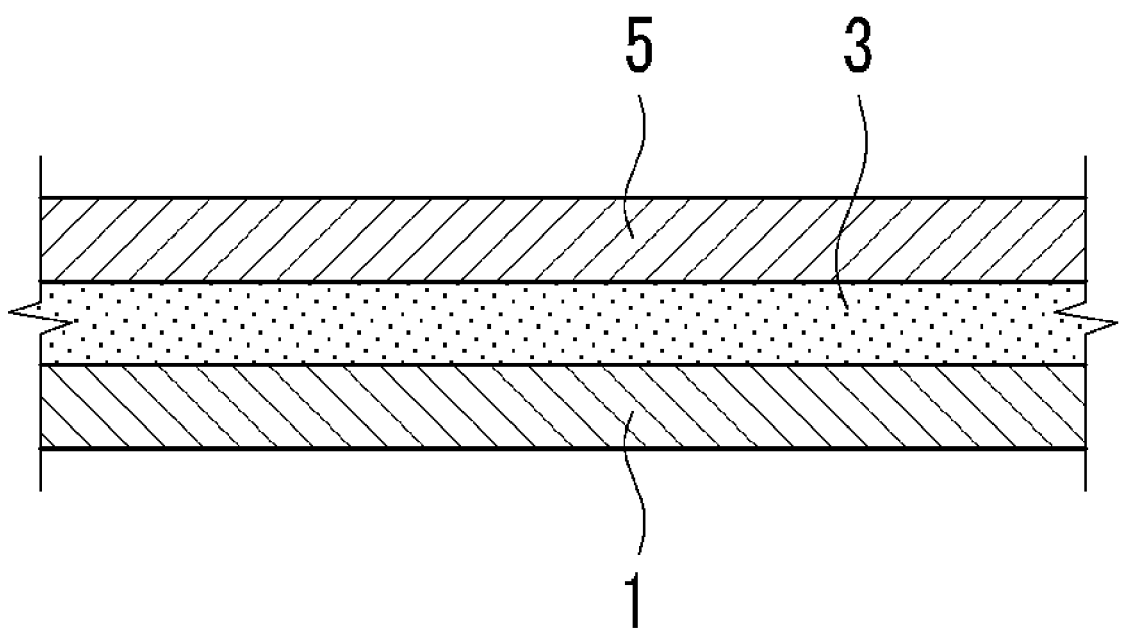

ADHESIVE COMPOSITION AND ADHESIVE FILM MADE THEREFROM

CROSS-REFERENCE TO RELATED APPLICATION

This application claims priority to Korean Patent Application No. 10-2009-0008605 filed on Feb. 3, 2009, and all the benefits accruing therefrom under 35 U.S.C. §119, the contents of which in its entirety are herein incorporated by reference.

BACKGROUND

1. Field

This disclosure relates to an adhesive composition and an adhesive film made therefrom.

2. Description of the Related Art

An adhesive film is generally used to protect the surface of a substrate made of metals, plastics, or the like, and is positioned between two substrates causing them to bond to each other. The adhesive film may be applied to a film for electric/electronic devices such as a polarizer, as well as to everyday goods. The adhesive film may be made of a liquid adhesive composition, and is strongly bonded to a substrate by treating the adhesive composition with heat or light. However, the use of heat of light to promote the bonding of the adhesive film to the substrate may also have detrimental effects such as subsequently causing the adhesive film to peel off from the substrate.

SUMMARY

It is desirable for an adhesive film o to display sufficient tackiness so as to not be easily peeled off by an external physiochemical force but a sufficient tackiness that it may be peeled off by the use of human effort when desired.

Disclosed herein is an adhesive composition having excellent tackiness and peeling characteristics so that it may be easily peeled off by a human being or a machine designed to do the peeling when desired. Disclosed herein is an adhesive composition that includes at least one of compounds represented by the following Chemical Formulae 1 to 3, a photopolymerization initiator, and a solvent.

[Chemical Formula 1]

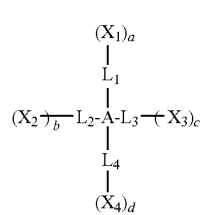

In the above Chemical Formula 1, A is carbon (C) or silicon (Si) bound with four substituents, $L_1$ to $L_4$ are the same or different and are independently selected from the group consisting of a single bond, a C1 to C20 substituted or unsubstituted alkylene, and a C6 to C20 substituted or unsubstituted arylene, where the substituted alkylene or arylene may be substituted with a C1 to C5 alkyl, and $X_1$ to $X_4$ are the same or different and are independently selected from the group consisting of hydrogen, a C1 to C5 alkyl, substituents represented by the following Chemical Formula 1-1 and substituents represented by the following Chemical Formula 1-2, provided that at least two $X_1$ to $X_4$ are selected from the group consisting of substituents represented by the following Chemical Formula 1-1 and substituents represented by the following Chemical Formula 1-2. In one embodiment, at least three of $X_1$ to $X_4$ may be substituents represented by the following Chemical Formula 1-1 and substituents represented by the following Chemical Formula 1-2.

a to d in the above Chemical Formula 1 are independently integers of 1 or 2, and when a to d are all equal to 2, each of $X_1$ to $X_4$ may be the same or different. It is to be noted that any one of $L_1$ to $L_4$ may be absent, in which case, A in Chemical Formula 1 will be correspondingly directly bonded to $X_1$, $X_2$, $X_3$ or $X_4$.

[Chemical Formula 1-1]

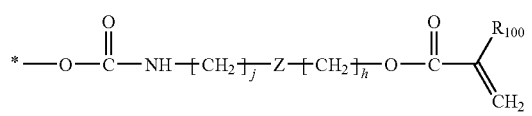

In the above Chemical Formula 1-1, Z is selected from the group consisting of a single bond, —O—, —COO—, and —OCO—, j is an integer ranging from 1 to 5, h is an integer ranging from 0 to 5, and $R_{100}$ is hydrogen or a methyl, provided that when Z is —O—, —COO—, or —OCO—, h is not zero (0).

[Chemical Formula 1-2]

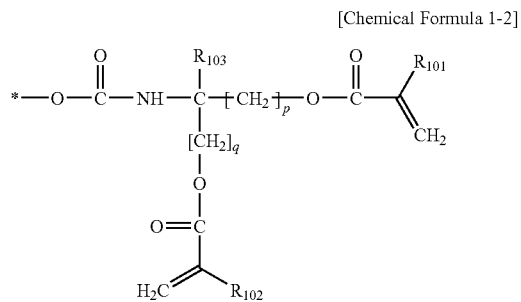

In the above Chemical Formula 1-2, p and q are independently integers ranging from 1 to 5, and $R_{101}$ to $R_{103}$ are independently hydrogen or a methyl.

[Chemical Formula 2]

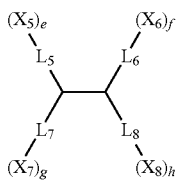

The compound of the above Chemical Formula 2 includes a carbon-carbon single bond in its core, and the two carbons linked by the single bond are respectively bound with the substituents $L_5$ to $L_8$, $L_5$ to $L_8$ are the same or different and are independently selected from the group consisting of a single bond, a C1 to C20 substituted or unsubstituted alkylene, and a C6 to C20 substituted or unsubstituted arylene, where the substituted alkylene or arylene may be substituted with a C1 to C5 alkyl, and $X_5$ to $X_8$ are the same or different and are independently selected from the group consisting of hydrogen, a C1 to C5 alkyl, substituents represented by the above Chemical Formula 1-1 and substituents represented by the following Chemical Formula 1-2, provided that at least two of $X_5$ to $X_8$ are selected from the group consisting of substituents represented by the above Chemical Formula 1-1 and substituents represented by the following Chemical Formula 1-2. In another embodiment, at least three of $X_5$ to $X_8$ are selected from the group consisting of substituents represented by the above Chemical Formula 1-1 and substituents represented by the following Chemical Formula 1-2. e to h in the Chemical Formula 2 are independently integers of 1 or 2, and when e to h are all equal to 2, each of $X_5$ to $X_8$ may be the same or different.

[Chemical Formula 3]

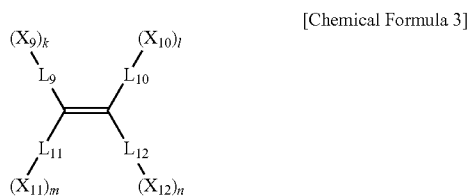

The compound of the above Chemical Formula 3 includes a carbon-carbon double bond in its core, and the two carbons linked by the double bond are respectively bound with the substituents $L_9$ to $L_{12}$. $L_9$ to $L_{12}$, are the same or different and are independently selected from the group consisting of a single bond, a C6 to C20 substituted or unsubstituted arylene and a C1 to C20 substituted or unsubstituted alkylene, where the substituted alkylene or arylene may be substituted with a C1 to C5 alkyl, and $X_9$ to $X_{12}$ are the same or different and are independently selected from the group consisting of hydrogen, a C1 to C5 alkyl, and substituents represented by the above Chemical Formula 1-1 or 1-2, provided that at least two of $X_9$ to $X_{12}$ are selected from the group consisting of substituents represented by the above Chemical Formula 1-1 and substituents represented by the following Chemical Formula 1-2. In one embodiment, at least three of $X_9$ to $X_{12}$ are selected from the group consisting of substituents represented by the above Chemical Formula 1-1 and substituents represented by the following Chemical Formula 1-2.

k to n in the Chemical Formula 3 are independently integers of 1 or 2, and when k to n are all equal to 2, each of $X_9$ to $X_{12}$ may be the same or different.

The compound of Chemical Formula 1 may include compounds represented by the following Chemical Formulae 1A to 1D.

[Chemical Formula 1A]

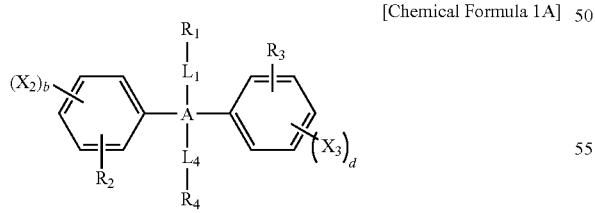

In the above Chemical Formula 1A, A is carbon (C) or silicon (Si), $L_1$ and $L_4$ are the same or different and are independently selected from the group consisting of a single bond, and C1 to C20 alkylene, $R_1$ to $R_4$ are the same or different and are independently selected from the group consisting of hydrogen, a C1 to C5 alkyl, substituents represented by the above Chemical Formula 1-1, and substituents represented by the above Chemical Formula 1-2, and $X_2$ and $X_3$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_1$ to $R_4$, $X_2$ and $X_3$ are selected from the group consisting of substituents represented by the above Chemical Formula 1-1 and substituents represented by the above Chemical Formula 1-2. In one embodiment at least three of $R_1$ to $R_4$, $X_2$ and $X_3$ are selected from the group consisting of substituents represented by the above Chemical Formula 1-1 and substituents represented by the above Chemical Formula 1-2.

b and d in the Chemical Formula 1A are independently integers of 1 or 2, and when b and d are both 2, each of $X_2$ and $X_3$ may be the same or different.

[Chemical Formula 1B]

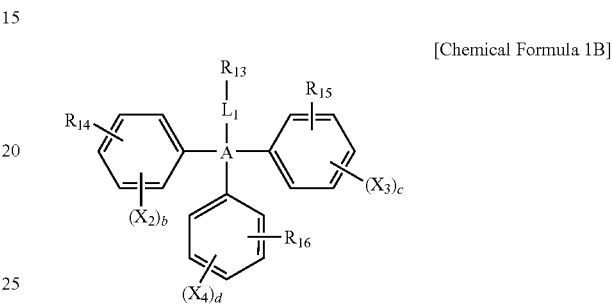

In the above Chemical Formula 1B, A is carbon (C) or silicon (Si), $L_1$ is selected from the group consisting of a single bond and a C1 to C20 alkylene, $R_{13}$ to $R_{16}$ are the same or different and are independently selected from the group consisting of hydrogen, a C1 to C5 alkyl, substituents represented by the above Chemical Formula 1-1 and substituents represented by the above Chemical Formula 1-2, and $X_2$ to $X_4$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{13}$ to $R_{16}$ and $X_2$ to $X_4$ are selected from the group consisting of substituents represented by the above Chemical Formula 1-1 and substituents represented by the above Chemical Formula 1-2. In one embodiment at least three of $R_{13}$ to $R_{16}$ and $X_2$ to $X_4$ are selected from the group consisting of substituents represented by the above Chemical Formula 1-1 and substituents represented by the above Chemical Formula 1-2.

b to d in the Chemical Formula 1B are independently integers of 1 or 2, and when b to d are all equal to 2, each of $X_2$ to $X_4$ may be the same or different.

[Chemical Formula 1C]

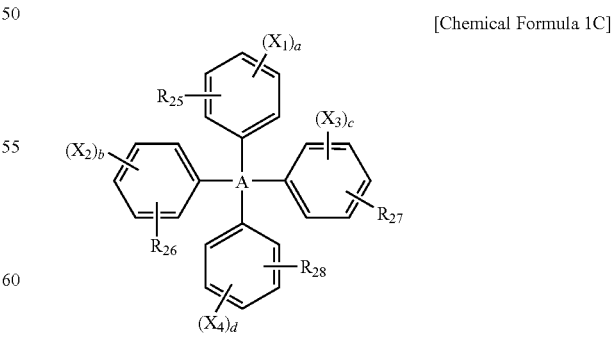

In the above Chemical Formula 1C, A is carbon (C) or silicon (Si), $R_{25}$ to $R_{28}$ are the same or different and are independently selected from the group consisting of hydrogen, a C1 to C5 alkyl, substituents represented by the above Chemical Formula 1-1 and substituents represented by the above Chemical Formula 1-2, and $X_1$ to $X_4$ are the same or different and are independently selected from the group consisting of hydrogen, a C1 to C5 alkyl, and substituents represented by the above Chemical Formula 1-1 and substituents represented by the above Chemical Formula 1-2, provided that at least two of $R_{25}$ to $R_{28}$ and $X_1$ to $X_4$ are selected from the group consisting of substituents represented by the above Chemical Formula 1-1 and substituents represented by the above Chemical Formula 1-2. In one embodiment at least three $R_{25}$ to $R_{28}$ and $X_1$ to $X_4$ are selected from the group consisting of substituents represented by the above Chemical Formula 1-1 and substituents represented by the above Chemical Formula 1-2. a to d in the Chemical Formula 1C are independently integers of 1 or 2, and when a to d are all equal to 2, each of $X_1$ to $X_4$ may be the same or different.

[Chemical Formula 1D]

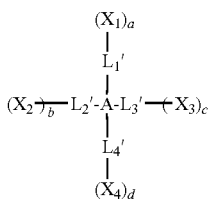

In the above Chemical Formula 1D, A is carbon (C) or silicon (Si), $L_1'$ to $L_4'$ are the same or different and are independently selected from the group consisting of a single bond, and a C1 to C20 substituted or unsubstituted alkylene, and $X_1$ to $X_4$ are the same or different and are independently selected from the group consisting of hydrogen, C1 to C5 alkyl, substituents represented by the above Chemical Formula 1-1 and substituents represented by the above Chemical Formula 1-2, provided that at least two of $X_1$ to $X_4$ are selected from the group consisting of substituents represented by the above Chemical Formula 1-1 and substituents represented by the above Chemical Formula 1-2. In one embodiment, at least three of $X_1$ to $X_4$ are selected from the group consisting of substituents represented by the above Chemical Formula 1-1 and substituents represented by the above Chemical Formula 1-2.
a to d in the Chemical Formula 1D are independently integers of 1 or 2, and when a to d are all equal to 2, each of $X_1$ to $X_4$ may be the same or different.

The compound of Chemical Formula 2 may include compounds represented by the following Chemical Formulae 2A to 2D.

[Chemical Formula 2A]

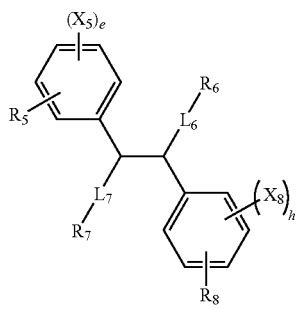

In the above Chemical Formula 2A, $L_6$ and $L_7$ are the same or different and are independently selected from the group consisting of a single bond, and a C1 to C20 alkylene, $R_5$ to $R_8$ are the same or different and are independently selected from the group consisting of hydrogen, a C1 to C5 alkyl, substituents represented by the above Chemical Formula 1-1 and substituents represented by the above Chemical Formula 1-2, and $X_5$ and $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_5$ to $R_8$, and $X_5$ and $X_8$ are selected from the group consisting of substituents represented by the above Chemical Formula 1-1 and substituents represented by the above Chemical Formula 1-2. In one embodiment, at least three of $R_5$ to $R_8$, $X_5$ and $X_8$ are selected from the group consisting of substituents represented by the above Chemical Formula 1-1 and substituents represented by the above Chemical Formula 1-2.

e and h in the Chemical Formula 2A are independently integers of 1 or 2, and when e and h are both equal to 2, each of $X_5$ and $X_8$ may be the same or different.

[Chemical Formula 2B]

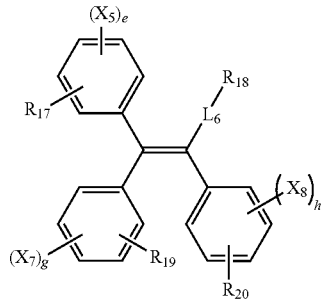

In the above Chemical Formula 2B, $L_6$ is selected from the group consisting of a single bond and a C1 to C20 alkylene, $R_{17}$ to $R_{20}$ are the same or different and are independently selected from the group consisting of hydrogen, a C1 to C5 alkyl, substituents represented by the above Chemical Formula 1-1 and substituents represented by the above Chemical Formula 1-2, and $X_5$, $X_7$, and $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{17}$ to $R_{20}$, $X_5$, $X_7$, and $X_8$ are selected from the group consisting of substituents represented by the above Chemical Formula 1-1 and substituents represented by the above Chemical Formula 1-2. In one embodiment, at least three of $R_{17}$ to $R_{20}$, $X_5$, $X_7$ and $X_8$ are selected from the group consisting of substituents represented by the above Chemical Formula 1-1 and substituents represented by the above Chemical Formula 1-2.

e, g, and h in the Chemical Formula 2B are independently integers of 1 or 2, and when e, g, and h are all equal to 2, each of $X_5$, $X_7$, and $X_8$ may be the same or different.

[Chemical Formula 2C]

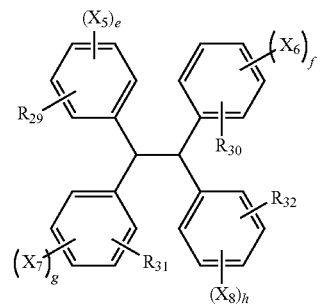

In the above Chemical Formula 2C, $R_{29}$ to $R_{32}$ are the same or different and are independently selected from the group consisting of hydrogen, a C1 to C5 alkyl, substituents represented by the above Chemical Formula 1-1 and substituents represented by the above Chemical Formula 1-2, and $X_5$ to $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{29}$ to $R_{32}$, and $X_5$ to $X_8$ are selected from the group consisting of substituents represented by the above Chemical Formula 1-1 and substituents represented by the above Chemical Formula 1-2. In one embodiment at least three of $R_{29}$ to $R_{32}$, and $X_5$ to $X_8$ are selected from the group consisting of substituents represented by the above Chemical Formula 1-1 and substituents represented by the above Chemical Formula 1-2.

e to h in the Chemical Formula 2C are independently integers of 1 or 2, and when e to h are both equal to 2, each of $X_5$ to $X_8$ may be the same or different.

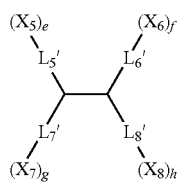

[Chemical Formula 2D]

In the above Chemical Formula 2D, $L_5'$ to $L_8'$ are independently selected from the group consisting of a single bond and a C1 to C20 substituted or unsubstituted alkylene, and $X_5$ to $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_5$ to $X_8$ are substituents represented by the above Chemical Formula 1-1 and substituents represented by the above Chemical Formula 1-2. In one embodiment, at least three of $X_5$ to $X_8$ are substituents represented by the above Chemical Formula 1-1 and substituents represented by the above Chemical Formula 1-2. e to h in the Chemical Formula 2D are independently integers of 1 or 2, and when e to h are all equal to 2, each of $X_5$ to $X_8$ may be the same or different.

The compound of Chemical Formula 3 may include compounds represented by the following Chemical Formulae 3A to 3D.

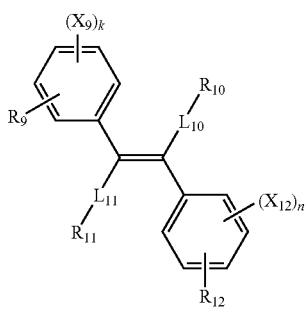

[Chemical Formula 3A]

In the above Chemical Formula 3A, $L_{10}$ and $L_{11}$, are independently selected from the group consisting of a single bond, and C1 to C20 alkylene, $R_9$ to $R_{12}$ are the same or different and are independently selected from the group consisting of hydrogen, a C1 to C5 alkyl, substituents represented by the above Chemical Formula 1-1 and substituents represented by the above Chemical Formula 1-2, and $X_9$ and $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_9$ to $R_{12}$, $X_9$, and $X_{12}$ are selected from the group consisting of substituents represented by the above Chemical Formula 1-1 and substituents represented by the above Chemical Formula 1-2. In one embodiment, at least three of $R_9$ to $R_{12}$, $X_9$, and $X_{12}$ are selected from the group consisting of substituents represented by the above Chemical Formula 1-1 and substituents represented by the above Chemical Formula 1-2. k and n in the Chemical Formula 3A are independently integers of 1 or 2, and when k and n are both 2, each of $X_9$ and $X_{12}$ may be the same or different.

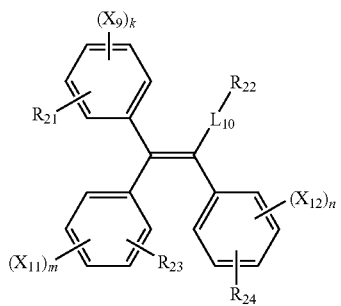

[Chemical Formula 3B]

In the above Chemical Formula 3B, $L_{10}$ is selected from the group consisting of a single bond and a C1 to C20 alkylene, $R_{21}$ to $R_{24}$ are the same or different and are independently selected from the group consisting of hydrogen, a C1 to C5 alkyl, substituents represented by the above Chemical Formula 1-1 and substituents represented by the above Chemical Formula 1-2, and $X_9$, $X_{11}$, and $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{21}$ to $R_{24}$, $X_8$, $X_{11}$, and $X_{12}$ are selected from the group consisting of substituents represented by the above Chemical Formula 1-1 and substituents represented by the above Chemical Formula 1-2. In one embodiment, at least three of $R_{21}$ to $R_{24}$, $X_9$, $X_{11}$, and $X_{12}$ are selected from the group consisting of substituents represented by the above Chemical Formula 1-1 and substituents represented by the above Chemical Formula 1-2.

k, m, and n in the Chemical Formula 3B are independently integers of 1 or 2, and when k, m, and n are all equal to 2, each of $X_9$, $X_{11}$, and $X_{12}$ may be the same or different.

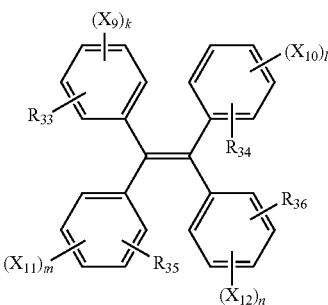

[Chemical Formula 3C]

In the above Chemical Formula 3C, $R_{33}$ to $R_{36}$ are the same or different and are independently selected from the group consisting of hydrogen, a C1 to C5 alkyl, substituents represented by the above Chemical Formula 1-1 and substituents represented by the above Chemical Formula 1-2, and $X_9$ to $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{33}$ to $R_{36}$ and $X_9$ to $X_{12}$ are selected from the group consisting of substituents represented by the above Chemical Formula 1-1 and substituents represented by the above Chemical Formula 1-2. In one embodiment, at least three of $R_{33}$ to $R_{36}$ and $X_9$ to $X_{12}$ are selected from the group consisting of substituents represented by the above Chemical Formula 1-1 and substituents represented by the above Chemical Formula 1-2. k to n in the Chemical Formula 3C are independently integers of 1 or 2, and when k to n are each equal to 2, each of $X_9$ to $X_{12}$ may be the same or different.

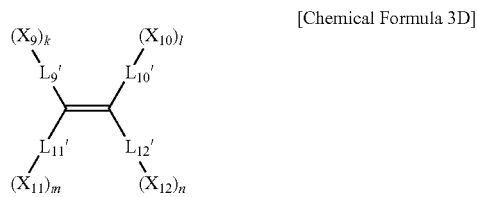

[Chemical Formula 3D]

In the above Chemical Formula 3D, $L_9'$ to $L_{12}'$ are independently selected from the group consisting of a single bond, and a C1 to C20 substituted or unsubstituted alkylene, and $X_9$ to $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_9$ to $X_{12}$ are selected from the group consisting of substituents represented by the above Chemical Formula 1-1 and substituents represented by the above Chemical Formula 1-2. In one embodiment, at least three of $X_9$ to $X_{12}$ are selected from the group consisting of substituents represented by the above Chemical Formula 1-1 and substituents represented by the above Chemical Formula 1-2.

k to n in the Chemical Formula 3D are independently integers of 1 or 2, and when k to n are all equal to 2, each of $X_9$ to $X_{12}$ may be the same or different.

Non-limiting examples of the photopolymerization initiators are those selected from the group consisting of α-hydroxy ketone, benzyl ketal, benzyldimethyl ketal, benzophenone, acetophenone, benzoin, benzoin methylether, benzoin ethylether, benzoin benzoic acid, methyl benzoin benzoate, 2,4-diethyl thioxanthone, 1-hydroxycyclohexyl phenyl ketone, benzyldiphenylsulfide, tetramethyl thiuram monosulfide, 2,2-dimethoxy-2-phenylacetophenone, and combinations thereof.

The adhesive composition may further include an adhesive binder. The adhesive binder may be selected from the group consisting of a polyester-based binder, a urethane-based binder, a silicone-based binder, a natural rubber-based binder, an acryl-based binder, and combinations thereof.

Disclosed herein too is an adhesive film made using the adhesive composition.

Hereinafter, further aspects of the present invention will be described in detail.

BRIEF DESCRIPTION OF THE DRAWING

The above and other aspects, advantages, and features of the invention will become more apparent by describing in further detail exemplary embodiments thereof with reference to the attached drawings in which:

FIG. 1 is a schematic cross-sectional view of an adhesive film.

DETAILED DESCRIPTION

The present invention will be described more fully hereinafter in the following detailed description of the invention, in which some but not all embodiments of the invention are described. This invention may be embodied in many different forms and is not construed as limited to the embodiments set forth herein; rather, these embodiments are provided so that this disclosure will satisfy applicable legal requirements.

As used herein, the terms "a" and "an" are open terms that may be used in conjunction with singular items or with plural items.

As used herein, the term "(meth)acrylate" refers to both acrylate and methacrylate.

The use of the terms such as "a to d" used below with reference to Chemical Formula 1 and other similar expressions used with reference to other Chemical Formulae are meant to imply "a, b, c and d".

The term "single bond" implies that the particular substitutent is "optional". For example, the statement "$L_9'$ to $L_{12}'$ are independently selected from the group consisting of a single bond, and a C1 to C20 substituted or unsubstituted alkylene" implies that $L_9'$ to $L_{12}'$ are optional and may not be present. In the event that a particular substitutent is absent then the core atom will be covalently bonded to a terminal atom in a given structure depicted in this disclosure.

The term "and/or" is used to imply both "and" and "or". For example, the statement that "X includes A and/or B" implies that X may include, A, B, or a combination of A and B. Similarly, the statement that "X is selected from the group consisting of A and/or B" implies that X may be selected from the group consisting of A, B, or a combination of A and B.

The adhesive composition includes a compound having at least one of a multi-functional urethane (meth)acrylate group selected from the group consisting of compounds represented by the following Chemical Formulae 1 to 3, a photopolymerization initiator, and a solvent.

[Chemical Formula 1]

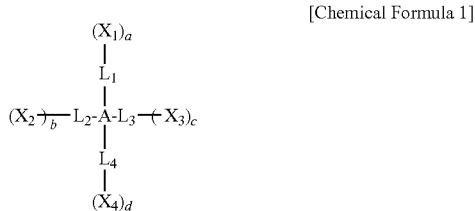

In the above Chemical Formula 1, A is carbon (C) or silicon (Si) bound with four substituents, $L_1$ to $L_4$ are the same or different and are independently selected from the group consisting of a single bond, a C1 to C20 substituted or unsubstituted alkylene, and a C6 to C20 substituted or unsubstituted arylene, where the substituted alkylene or arylene may be substituted with a C1 to C5 alkyl, and $X_1$ to $X_4$ are the same or different and are independently selected from the group consisting of hydrogen, a C1 to C5 alkyl, substituents represented by the following Chemical Formula 1-1 and substituents represented by the following Chemical Formula 1-2, provided that at least two of $X_1$ to $X_4$ are selected from the group consisting of substituents represented by the following Chemical Formula 1-1 and substituents represented by the following Chemical Formula 1-2. In one embodiment, at least three of $X_1$ to $X_4$ are selected from the group consisting of substituents represented by the following Chemical Formula 1-1 and substituents represented by the following Chemical Formula 1-2.

a to d in the Chemical Formula 1 are independently integers of 1 or 2, and when a to d are all equal to 2, each of $X_1$ to $X_4$ may be the same or different.

[Chemical Formula 1-1]

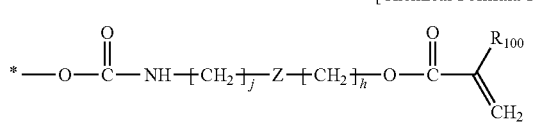

In the above Chemical Formula 1-1, Z is selected from the group consisting of a single bond, —O—, —COO—, and —OCO—, j is an integer ranging from 1 to 5, h is an integer ranging from 0 to 5, and $R_{100}$ is hydrogen or a methyl, provided that when Z is —O—, —COO—, or —OCO—, h is not zero (0).

[Chemical Formula 1-2]

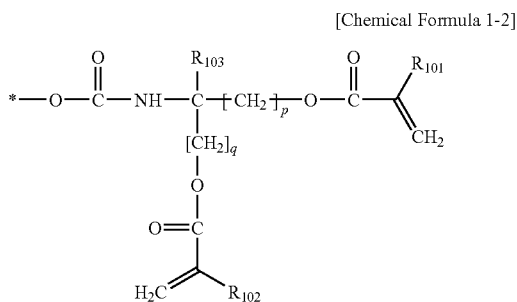

In the above Chemical Formula 1-2, p and q are independently integers ranging from 1 to 5, and $R_{101}$ to $R_{103}$ are independently hydrogen or a methyl.

[Chemical Formula 2]

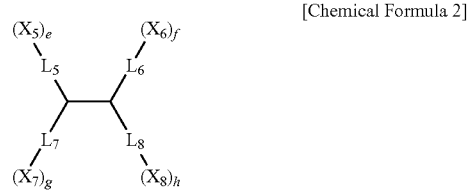

The compound of the above Chemical Formula 2 includes a carbon-carbon single bond in its core, and the two carbons linked by the single bond are respectively bound with the substituents $L_5$ to $L_8$, $L_5$ to $L_8$ are the same or different and are independently selected from the group consisting of a single bond, a C1 to C20 substituted or unsubstituted alkylene, and a C6 to C20 substituted or unsubstituted arylene, where the substituted alkylene or arylene may be substituted with a C1 to C5 alkyl, and $X_5$ to $X_8$ are independently selected from the group consisting of hydrogen, a C1 to C5 alkyl, substituents represented by the above Chemical Formula 1-1 and substituents represented by the above Chemical Formula 1-2, provided that at least two of $X_5$ to $X_8$ are selected from the group consisting of substituents represented by the above Chemical Formula 1-1 and substituents represented by the above Chemical Formula 1-2. In one embodiment, at least three of $X_5$ to $X_8$ are selected from the group consisting of substituents represented by the above Chemical Formula 1-1 and substituents represented by the above Chemical Formula 1-2.

e to h in the Chemical Formula 2 are independently integers of 1 or 2, and when e to h are all equal to 2, each of $X_5$ to $X_8$ may be the same or different.

[Chemical Formula 3]

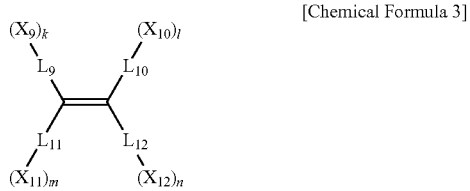

The compound of the above Chemical Formula 3 includes a carbon-carbon double bond in its core, and the two carbons linked by the double bond are respectively bound with the substituents $L_9$ to $L_{12}$. $L_9$ to $L_{12}$ are the same or different and are independently selected from the group consisting of a single bond, a C6 to C20 substituted or unsubstituted arylene and a C1 to C20 substituted or unsubstituted alkylene, where the substituted alkylene or arylene may be substituted with a C1 to C5 alkyl, and $X_9$ to $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_9$ to $X_{12}$ are selected from the group consisting of substituents represented by the above Chemical Formula 1-1 and substituents represented by the above Chemical Formula 1-2. In one embodiment, at least three of $X_9$ to $X_{12}$ are selected from the group consisting of substituents represented by the above Chemical Formula 1-1 and substituents represented by the above Chemical Formula 1-2.

k to n in the Chemical Formula 3 are independently integers of 1 or 2, and when k to n are both equal to 2, each of $X_9$ to $X_{12}$ may be the same or different.

The compound of Chemical Formula 1 may include compounds represented by the following Chemical Formulae 1A to 1D.

[Chemical Formula 1A]

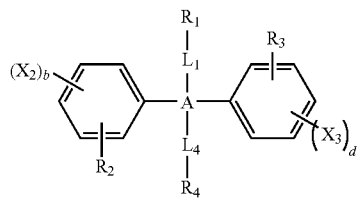

In the above Chemical Formula 1A, A is carbon (C) or silicon (Si), $L_1$ and $L_4$ are the same or different and are independently selected from the group consisting of a single bond, and C1 to C20 alkylene. $R_1$ to $R_4$ are the same or different and are independently hydrogen, C1 to C5 alkyl, substituents represented by the above Chemical Formula 1-1 and substituents represented by the above Chemical Formula 1-2, and $X_2$ and $X_3$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_1$ to $R_4$, $X_2$, and $X_3$ are selected from the group consisting of substituents represented by the above Chemical Formula 1-1 and substituents represented by the above Chemical Formula 1-2. In one embodiment at least three of $R_1$ to $R_4$, $X_2$, and $X_3$ are selected from the group consisting of substituents represented by the above Chemical Formula 1-1 and substituents represented by the above Chemical Formula 1-2.

b and d in the Chemical Formula 1A are independently integers of 1 or 2, and when b and d are both equal to 2, each of $X_2$ and $X_3$ may be the same or different.

[Chemical Formula 1B]

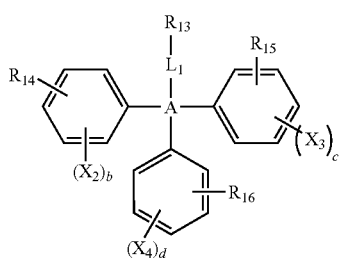

In the above Chemical Formula 1B, A is carbon (C) or silicon (Si), $L_1$ is selected from the group consisting of a single bond and a C1 to C20 alkylene, $R_{13}$ to $R_{16}$ are the same or different and are independently selected from the group consisting of hydrogen, a C1 to C5 alkyl, substituents represented by the above Chemical Formula 1-1 and substituents represented by the above Chemical Formula 1-2, and $X_2$ to $X_4$ are independently selected from the group consisting of hydrogen, a C1 to C5 alkyl, substituent's represented by the above Chemical Formula 1-1 and substituent's represented by the above Chemical Formula 1-2, provided that at least two of $R_{13}$ to $R_{16}$ and $X_2$ to $X_4$ are selected from the group consisting of a substituent represented by the Chemical Formula 1-1 and substituent's represented by the above Chemical Formula 1-2. In one embodiment at least three of $R_{13}$ to $R_{16}$ and $X_2$ to $X_4$ are selected from the group consisting of substituents represented by the above Chemical Formula 1-1 and substituent's represented by the above Chemical Formula 1-2.

b to d in the Chemical Formula 1B are independently integers of 1 or 2, and when b to d are all equal to 2, each of $X_2$ to $X_4$ may be the same or different.

[Chemical Formula 1C]

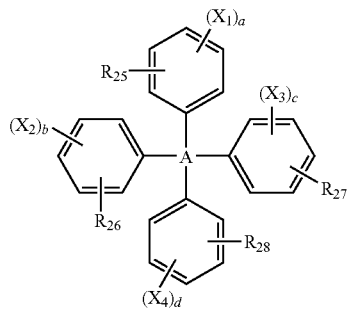

In the above Chemical Formula 1C, A is carbon (C) or silicon (Si), $R_{25}$ to $R_{28}$ are the same or different and are independently selected from the group consisting of hydrogen, a C1 to C5 alkyl, substituent's represented by the above Chemical Formula 1-1 and substituent's represented by the above Chemical Formula 1-2, and $X_1$ to $X_4$ are the same of different and are independently selected from the group consisting of hydrogen, a C1 to C5 alkyl, substituent's represented by the above Chemical Formula 1-1 and substituent's represented by the above Chemical Formula 1-2, provided that at least two of $R_{25}$ to $R_{28}$ and $X_1$ to $X_4$ are selected from the group consisting of substituents represented by the above Chemical Formula 1-1 and substituent's represented by the above Chemical Formula 1-2. In one embodiment at least three of $R_{25}$ to $R_{28}$ and $X_1$ to $X_4$ are selected from the group consisting of substituents represented by the above Chemical Formula 1-1 and substituent's represented by the above Chemical Formula 1-2.

a to d in the Chemical Formula 1C are independently integers of 1 or 2, and when a to d are all equal to 2, each of $X_1$ to $X_4$ may be the same or different.

[Chemical Formula 1D]

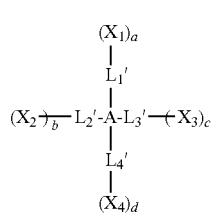

In the above Chemical Formula 1D, A is carbon (C) or silicon (Si), $L_1'$ to $L_4'$ are the same or different and are independently selected from the group consisting of a single bond, and a C1 to C20 substituted or unsubstituted alkylene. $X_1$ to $X_4$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_1$ to $X_4$ are selected from the group consisting of substituents represented by the above Chemical Formula 1-1 and substituents represented by the above Chemical Formula 1-2. In one embodiment, at least three of $X_1$ to $X_4$ are selected from the group consisting of substituents represented by the above Chemical Formula 1-1 and substituents represented by the above Chemical Formula 1-2.

a to d in the Chemical Formula 1D are independently integers of 1 or 2, and when a to d are all equal to 2, each of $X_1$ to $X_4$ may be the same or different.

The compound of Chemical Formula 2 may include compounds represented by the following Chemical Formulae 2A to 2D.

[Chemical Formula 2A]

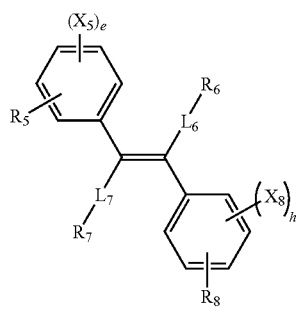

In the above Chemical Formula 2A, $L_6$ and $L_7$ are independently selected from the group consisting of a single bond, and a C1 to C20 alkylene, $R_5$ to $R_8$ are the same or different and are independently selected from the group consisting of hydrogen, a C1 to C5 alkyl, substituents represented by the above Chemical Formula 1-1 and substituents represented by the above Chemical Formula 1-2, and $X_5$ and $X_8$ are the same of different and are independently selected from the group consisting of hydrogen, a C1 to C5 alkyl, substituents represented by the above Chemical Formula 1-1 and substituents represented by the above Chemical Formula 1-2, provided that at least two of $R_5$ to $R_8$, and $X_5$, and $X_8$ are selected from the group consisting of substituents represented by the above Chemical Formula 1-1 and substituents represented by the above Chemical Formula 1-2. In one embodiment, at least three of $R_5$ to $R_8$, $X_5$, and $X_8$ are selected from the group consisting of substituents represented by the above Chemical Formula 1-1 and substituents represented by the above Chemical Formula 1-2.

e and h in the Chemical Formula 2A are independently integers of 1 or 2, and when e and h are both 2, each of $X_5$ and $X_8$ may be the same or different.

[Chemical Formula 2B]

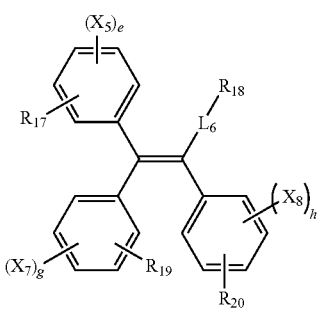

In the above Chemical Formula 2B, $L_6$ is selected from the group consisting of a single bond and a C1 to C20 alkylene, $R_{17}$ to $R_{20}$ are the same or different and are independently selected from the group consisting of hydrogen, a C1 to C5 alkyl, substituents represented by the above Chemical Formula 1-1 and substituents represented by the above Chemical Formula 1-2, and $X_5$, $X_7$ and $X_8$ are the same or different are independently selected from the group consisting of hydrogen, a C1 to C5 alkyl, substituents represented by the above Chemical Formula 1-1 and substituents represented by the above Chemical Formula 1-2, provided that at least two of $R_{17}$ to $R_{20}$, $X_5$, $X_7$ and $X_8$ are selected from the group consisting of substituents represented by the following Chemical Formula 1-1 and substituents represented by the above Chemical Formula 1-2. In one embodiment at least three of $R_{17}$ to $R_{20}$, $X_5$, $X_7$ and $X_8$ are selected from the group consisting of substituents represented by the above Chemical Formula 1-1 and substituents represented by the above Chemical Formula 1-2.

e, g, and h in the Chemical Formula 2B are independently integers of 1 or 2, and when e, g, and h are all equal to 2, each of $X_5$, $X_7$, and $X_8$ may be the same or different.

[Chemical Formula 2C]

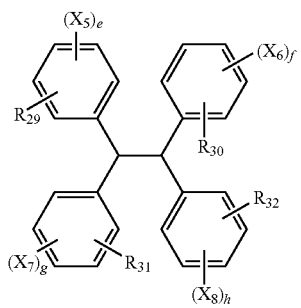

In the above Chemical Formula 2C, $R_{29}$ to $R_{32}$ are the same or different and are independently selected from the group consisting of hydrogen, a C1 to C5 alkyl, substituents represented by the above Chemical Formula 1-1 and substituents represented by the above Chemical Formula 1-2, and $X_5$ to $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{29}$ to $R_{32}$, and $X_5$ to $X_8$ are selected from the group consisting of substituents represented by the above Chemical Formula 1-1 and substituents represented by the above Chemical Formula 1-2. In one embodiment at least three of $R_{29}$ to $R_{32}$, and $X_5$ to $X_8$ are selected from the group consisting of substituents represented by the above Chemical Formula 1-1 and substituents represented by the above Chemical Formula 1-2.

e to h in the Chemical Formula 2C are independently integers of 1 or 2, and when e to h are all equal to 2, each of $X_5$ to $X_8$ may be the same or different.

[Chemical Formula 2D]

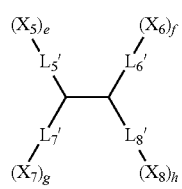

In the above Chemical Formula 2D, $L_5'$ to $L_8'$ are the same or different and are independently selected from the group consisting of a single bond and a C1 to C20 substituted or unsubstituted alkylene, and $X_5$ to $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_5$ to $X_8$ are substituents represented by the above Chemical Formula 1-1 and substituents represented by the above Chemical Formula 1-2. In one embodiment, at least three of $X_5$ to $X_8$ are substituents represented by the above Chemical Formula 1-1 and substituents represented by the above Chemical Formula 1-2.

e to h in the Chemical Formula 2D are independently integers of 1 or 2, and when e to h are all equal to 2, each of $X_5$ to $X_8$ may be the same or different.

The compound of Chemical Formula 3 may include compounds represented by the following Chemical Formulae 3A to 3D.

[Chemical Formula 3A]

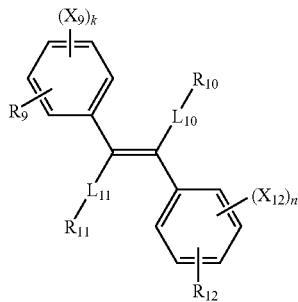

In the above Chemical Formula 3A, $L_{10}$ and $L_{11}$ are the same or different and are independently selected from the group consisting of a single bond, and C1 to C20 alkylene, $R_9$ to $R_{12}$ are the same or different and are independently selected from the group consisting of hydrogen, a C1 to C5 alkyl, and substituents represented by the above Chemical Formula 1-1 and substituents represented by the above Chemical Formula 1-2, and $X_9$ and $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_9$ to $R_{12}$, $X_9$ and $X_{12}$ are selected from the group consisting of substituents represented by the above Chemical Formula 1-1 and substituents represented by the above Chemical Formula 1-2. In one embodiment, at least three of $R_9$ to $R_{12}$, $X_9$, and $X_{12}$ are selected from the group consisting of substituents represented by the above Chemical Formula 1-1 and substituents represented by the above Chemical Formula 1-2. k and n in the Chemical Formula 3A are independently integers of 1 or 2, and when k and n are both equal to 2, each of $X_9$ and $X_{12}$ may be the same or different.

[Chemical Formula 3B]

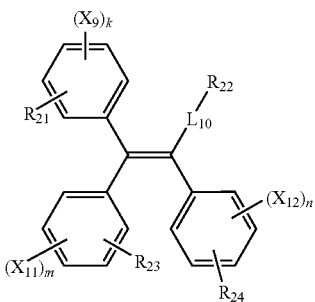

In the above Chemical Formula 3B, $L_{10}$ is selected from the group consisting of a single bond and a C1 to C20 alkylene, $R_{21}$ to $R_{24}$ are the same or different and are independently selected from the group consisting of hydrogen, a C1 to C5 alkyl, substituents represented by the above Chemical Formula 1-1 and substituents represented by the above Chemical Formula 1-2, and $X_9$, $X_{11}$, and $X_{12}$ are the same or different and are independently selected from the group consisting of hydrogen, a C1 to C5 alkyl, substituents represented by the above Chemical Formula 1-1 and substituents represented by the above Chemical Formula 1-2, provided that $R_{21}$ to $R_{24}$, $X_9$, $X_{11}$, and $X_{12}$ are selected from the group consisting of substituents represented by the above Chemical Formula 1-1 and substituents represented by the above Chemical Formula 1-2. In one embodiment, at least three of $R_{21}$ to $R_{24}$, $X_9$, $X_{11}$, and $X_{12}$ are selected from the group consisting of substituents represented by the above Chemical Formula 1-1 and substituents represented by the above Chemical Formula 1-2.

k, m, and n in the Chemical Formula 3B are independently integers of 1 or 2, and when k, m, and n are all equal to 2, each of $X_9$, $X_{11}$, and $X_{12}$ may be the same or different.

[Chemical Formula 3C]

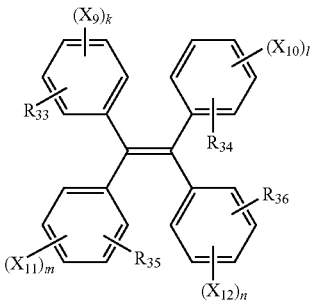

In the above Chemical Formula 3C, $R_{33}$ to $R_{36}$ are the same or different and are independently selected from the group consisting of hydrogen, a C1 to C5 alkyl, substituents represented by the above Chemical Formula 1-1 and substituents represented by the above Chemical Formula 1-2, and $X_9$ to $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{33}$ to $R_{36}$ and $X_9$ to $X_{12}$ are selected from the group consisting of substituents represented by the above Chemical Formula 1-1 and substituents represented by the above Chemical Formula 1-2. In one embodiment, at least three of $R_{33}$ to $R_{36}$ and $X_9$ to $X_{12}$ are selected from the group consisting of substituents represented by the above Chemical Formula 1-1 and substituents represented by the above Chemical Formula 1-2.

k to n in the Chemical Formula 3C are independently integers of 1 or 2, and when k to n are all equal to 2, each of $X_9$ to $X_{12}$ may be the same or different.

[Chemical Formula 3D]

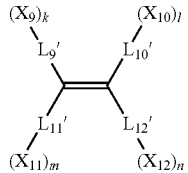

In the above Chemical Formula 3D, $L_9'$ to $L_{12}'$ are the same or different and are independently selected from the group consisting of a single bond, and a C1 to C20 substituted or unsubstituted alkylene, and $X_9$ to $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_9$ to $X_{12}$ are selected from the group consisting of substituents represented by the above Chemical Formula 1-1 and substituents represented by the above Chemical Formula 1-2. In one embodiment, at least three of $X_9$ to $X_{12}$ are selected from the group consisting of substituents represented by the above Chemical Formula 1-1 and substituents represented by the above Chemical Formula 1-2.

k to n in the Chemical Formula 3D are independently integers of 1 or 2, and when k to n are all equal to 2, each of $X_9$ to $X_{12}$ may be the same or different.

The compound having the multi-functional urethane (meth)acrylate group may be included in an amount of about 1 to about 30 wt % based on the total weight of the adhesive composition. Within the above range, mechanical properties of the adhesive composition may be significantly improved.

Non-limiting examples of the photopolymerization initiator include α-hydroxy ketone, benzyl ketal, benzyldimethyl ketal, benzophenone, acetophenone, benzoin, benzoin methylether, benzoin ethylether, benzoin benzoic acid, methyl benzoin benzoate, 2,4-diethyl thioxanthone, 1-hydroxycyclohexyl phenyl ketone, benzyldiphenyl sulfide, tetramethyl thiuram monosulfide, 2,2-dimethoxy-2-phenylacetophenone, or combinations thereof. The photopolymerization initiator may be included in an amount of about 0.01 to about 10 wt % based on the total weight of the adhesive composition. Within the above range, package reliability does not decrease due to transfer of non-reacted photopolymerization initiators into an adhesive layer, and sufficient photoinitiation efficiency may be obtained.

Non-limiting examples of the solvent include ethyl acetate, n-butyl acetate, isobutyl acetate, ethylene glycol monomethyl ether acetate, ethylene glycol n-butyl ether acetate, diethylene glycol dimethyl ether, diethylene glycol methyl ethyl ether, diethylene glycol ethyl ether acetate, dipropylene glycol, n-butylether, tripropylene glycol, n-propyl ether, tripropylene glycol methyl ether, propylene glycol methyl ether acetate, propylene glycol diacetate, propylene glycol monomethyl ether, propylene glycol monoethyl ether acetate, cyclohexanone, ethyl 3-methoxy propionate, methyl 3-ethoxy propionate, ethyl 3-ethoxypropionate, or combinations thereof. In one embodiment, at least one solvent selected from ethylene glycol n-butyl ether acetate ("EGBEA"), propylene glycol diacetate ("PGDA"), diethylene glycol monoethyl ether ("DPGME"), and diethylene glycol monoethyl ether (carbitol) may be used. The solvent may be included in a balance amount based on the total amount of the adhesive composition, and in one embodiment, may be included in an amount of about 40 to about 90 wt % based on the total weight of the adhesive composition.

The adhesive composition may further include an adhesive binder. The adhesive binder may be selected from the group consisting of a polyester-based binder, a urethane-based binder, a silicone-based binder, a natural rubber-based binder, an acryl-based binder, and combinations thereof. The acryl-based binder may easily have a functional group at its side chain and has film-forming properties. The acryl-based binder may be a polymer prepared by polymerizing a (meth)acrylate compound monomer including a hydroxyl group, a carboxyl group, an epoxy group, or an alkyl group, or a (meth)acrylate compound thereof. The adhesive binder may include a binder having a glass transition temperature of about −60 to about 0° C. and a molecular weight (a weight average molecular weight in case of a polymer) of about 100,000 to about 2,000,000.

The (meth)acrylate compound monomer may be a (meth)acrylate compound having a carbon-carbon double bond such as methyl(meth)acrylate, ethyl(meth)acrylate, butyl(meth)acrylate, isobutyl(meth)acrylate, 2-ethylhexyl(meth)acrylate, isooctyl(meth)acrylate, glycidyl(meth)acrylate, cyclohexyl(meth)acrylate, isobornyl(meth)acrylate, benzyl(meth)acrylate, 2-hydroxy(meth)acrylate, trimethoxybutyl(meth)acrylate, ethylcarbitol(meth)acrylate, phenoxyethyl(meth)acrylate, 2-hydroxyethyl(meth)acrylate, trimethylolpropanetri(meth)acrylate, tetramethylolmethane tetra(meth)acrylate, pentaerythritol hexa(meth)acrylate, pentaerythritol tetra(meth)acrylate, dipentadierythritol monohydroxy penta(meth)acrylate, dipentaerythritol hexa(meth)acrylate, 1,4-butyleneglycol di(meth)acrylate, 1,6-hexanediol di(meth)acrylate, polyethyleneglycol di(meth)acrylate, oligoester(meth)acrylate, and the like.

The adhesive binder may be included in an amount of about 5 to about 40 wt % based on the total weight of the adhesive composition. Within the above range, an adhesive film may be easily formed.

Furthermore, the adhesive composition may further include a cross-linking agent, a dispersing agent, and other additives.

Hereinafter, referring to FIG. 1, an adhesive film made using the above adhesive composition will be described.

FIG. 1 is a schematic cross-sectional view of an adhesive film.

Referring to FIG. 1, the adhesive film 3 is positioned between a lower substrate 1 and an upper substrate 5 to adhere them to each other. For example, the adhesive film 3 applied to a polarizer of a liquid crystal display (LCD), as either a lower substrate 1 or an upper substrate 3 may be in the form of a releasing film or a protective film. The releasing film or the protective film is to be removed after a liquid crystal display ("LCD") is completely fabricated. The adhesive film 3 may be made from the above adhesive composition. It strongly fixes a releasing film or a protective film due to excellent tackiness during the fabrication process of a liquid crystal display, and may allow easy removal of the releasing film or the protective film due to an excellent peeling characteristic after the fabrication process. While the polarizer of a liquid crystal display (LCD) is used as an example, the present invention is not limited thereto and may be applied to various adhesive films in many fields in addition to electric and electronic materials.

Hereinafter, the present invention is illustrated in more detail with reference to examples. However, they are exemplary embodiments of the present invention and are not limiting.

Example 1

Example 1-1

Synthesis of Adhesive Binder 900 parts by weight of ethylacetate as a solvent is added to a reactor in a dropwise fashion based on 100 parts by weight of an acrylate monomer. The mixture is heated at 79° C. and agitated. 100 parts by weight of the acrylate monomers including 40 wt % of 2-ethylhexyl acrylate, 10 wt % of isooctyl acrylate, 10 wt % of glycidyl methacrylate, 10 wt % of 2-hydroxyethyl methacrylate, 15 wt % of 2-hydroxyethyl acrylate, 5 wt % of methylmethacrylate, 10 wt % of butylacrylate, and 0.03 parts by weight of azobisisobutyronitrile (AIBN) are added together in a dropwise fashion for 3 hours, while being refluxed. After the resulting mixture is agitated for 5 hours, 10 parts by weight of ethylacetate and 0.1 parts by weight of azobisisobutyronitrile are additionally added in a dropwise fashion for 20 minutes based on 100 parts by weight of the acrylate monomers. Two hours later, 10 parts by weight of ethyl acetate and 0.1 parts by weight of azobisisobutyronitrile are additionally added thereto in a dropwise fashion based on 100 parts by weight of the acrylate monomers. The mixture is maintained for 3 hours, and 20 parts by weight of ethylacetate and 20 parts by weight of toluene are added to 100 parts by weight of the acrylate monomers. The resulting mixture is cooled, preparing an adhesive binder solution (its solid content: 9.4 wt %).

Example 1-2

Synthesis of the Compound with Multi-functional Urethane (Meth)Acrylate Group

Example 1-2-1

Synthesis of the Compound of Chemical Formula A

Firstly, the compound represented by the Chemical Formula f is synthesized according to the following Reaction Scheme 1.

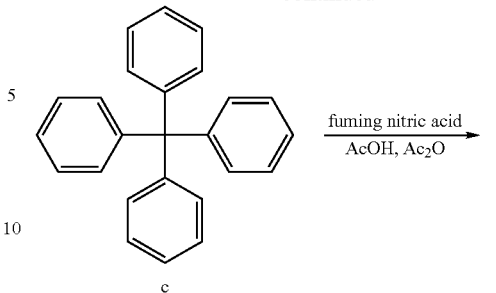

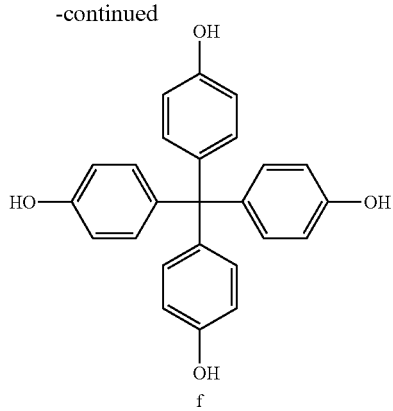

f

The compound represented by Chemical Formula f according to the following Reaction Scheme 1 is prepared as follows. 750 g (2.69 mol) of a compound of Chemical Formula a and 678 grams ("g") (7.28 moles ("mol")) of aniline are added in a 10000 milliliter ("ml") round flask, heated to 200° C., agitated for 5 minutes, and then cooled to 90° C. Then, 4100 ml of HCl and 3100 ml of methanol are added thereto for one hour, and the resultant mixture is refluxed for 1 hour. The solid material is filtrated, washed with 300 ml of methanol, and then added in 5000 ml of ethanol. While the mixture is agitated, 816 ml of sulfuric acid is slowly added in a dropwise fashion. The resulting mixture is cooled to −10° C., and 610 ml of isoamylnitrite is slowly added thereto. They are agitated together for 1 hour. Then, 1220 ml of phosphoric acid is added thereto while its temperature is maintained. The mixture is heated and then refluxed and agitated for one hour, obtaining 700 g of a compound represented by Chemical Formula c ($^1$H NMR (300 MHz, CDCl$_3$), δ 7.18-7.25 (m, 20H)).

2750 ml of nitric acid is put in a flask and cooled to −10° C., 550 g (1.71 mol) of a compound of Chemical Formula c is slowly added thereto, and 1830 ml of acetic acidanhydride is slowly added thereto in a dropwise fashion. Then, 3660 ml of acetic acid is added thereto, and the resultant mixture is agitated for 1 hour and then filtrated and washed, obtaining 335 g of a compound of Chemical Formula d ($^1$H NMR (300 MHz, DMSO) δ 7.59 (d, 8H), 8.22 (d, 8H)).

4500 ml of tetrahydrofuran is added in a hydrogenizing reactor, and 450 g (0.89 mol) of a compound of Chemical Formula d is added thereto. Then, 90 g of a palladium/carbon catalyst is added to 1200 ml of ethanol. The mixture is slowly added in the reactor while agitating it. The resulting mixture is agitated for 30 hours while hydrogen gas is constantly injected therein. It is washed with ethanol and n-hexane and then dried, obtaining 295 g of a compound of Chemical Formula e of the Reaction Scheme 1 ($^1$H NMR (300 MHz, DMSO) δ 4.83 (s, 8H), 6.37 (d, 8H), 6.66 (d, 8H)).

400 g (1.05 mol) of a compound of Chemical Formula e is put in 1200 ml of ultrapure water and then agitated, and 320 ml of sulfuric acid is added thereto. Then, sodium nitrite is added at 0° C. in a dropwise fashion and agitated at 50° C., resultantly obtaining tetrakis(p-hydroxyphenyl)methane (a compound of Chemical Formula f) ($^1$H NMR (300 MHz, DMSO) δ 6.60 (d, 8H), 6.80 (d, 8H), 9.25 (s, 4H)).

Then, a compound of Chemical Formula A is synthesized according to the following Reaction Scheme 2 by using the compound of Chemical Formula f.

[Reaction Scheme 2]

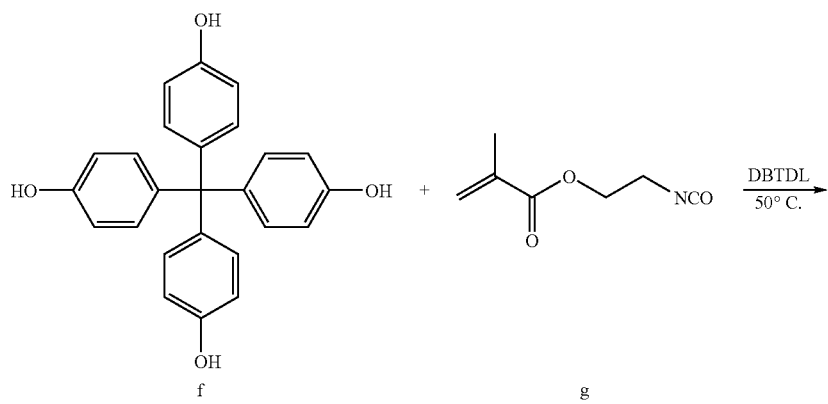

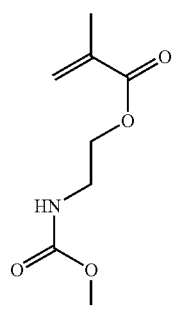

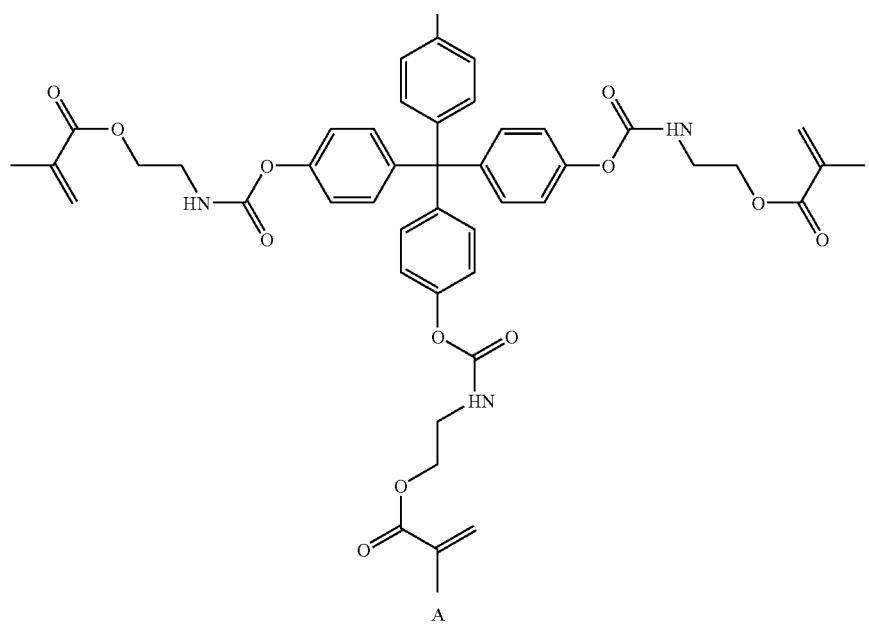

A

According to the Reaction Scheme 2, 38.42 g (0.1 mol) of tetrakis(p-hydroxyphenyl)methane (the compound of Chemical Formula f) is dissolved in 500 ml of ethyl acetate. The solution is reacted with (65.16 g, 0.42 mol) methacryloyl oxyethyl isocyanate (the compound of Chemical Formula g) at 50° C. for 15 hours by using 6.63 g (0.0105 mol) of dibutyl tin dilaurate (DBTDL) as a catalyst, finally obtaining a compound represented by Chemical Formula A ($^1$H NMR (300 MHz, CDCl$_3$) δ 8.08 (t NH), 6.7-6.9 (d 8H), 6.8-7.0 (d 8H), 5.94, 5.45 (s C=CH$_2$), 4.00 (t CH$_2$), 3.29 (t CH$_2$), 1.78 (s CH$_3$)).

Example 1-3

Synthesis of Adhesive Composition

An adhesive composition is prepared by mixing 5 g of the compound of the Chemical Formula A (compound with a multi-functional urethane (meth)acrylate group) of Example 1-2 with 100 g of the adhesive binder solution obtained according to Example 1-1, and adding 0.01 wt % of a photo-polymerization initiator including an α-hydroxy ketone type Irgacure 184 (Ciba chemical), and benzyldimethyl ketal type Irgacure 651 (Ciba chemical).

Example 2

An adhesive composition is prepared according to the same method as in Example 1 by including 10 g of the compound of the Chemical Formula A of Example 1.

Example 3

An adhesive composition is prepared according to the same method as in Example 1 except for using 1 g of the compound of the following the Chemical Formula B instead of the compound of the Chemical Formula A according to Example 1.

Example 3-2-1

Synthesis of a Compound of the Chemical Formula B

The compound of the following Chemical Formula B ($^1$H NMR (300 MHz, CDCl$_3$) δ 6.9-7.0 (d 6H), 7.0-7.1 (d 6H), 6.13, 5.59 (s C=CH$_2$), 4.26 (t CH$_2$), 3.56 (t CH$_2$), 2.02 (s CH$_3$), 1.91 (s CH$_3$)) is prepared according to the same method as in Example 1 except for using 1,1,1-tris(4-hydroxyphenyl)ethane instead of tetrakis(p-hydroxyphenyl)methane.

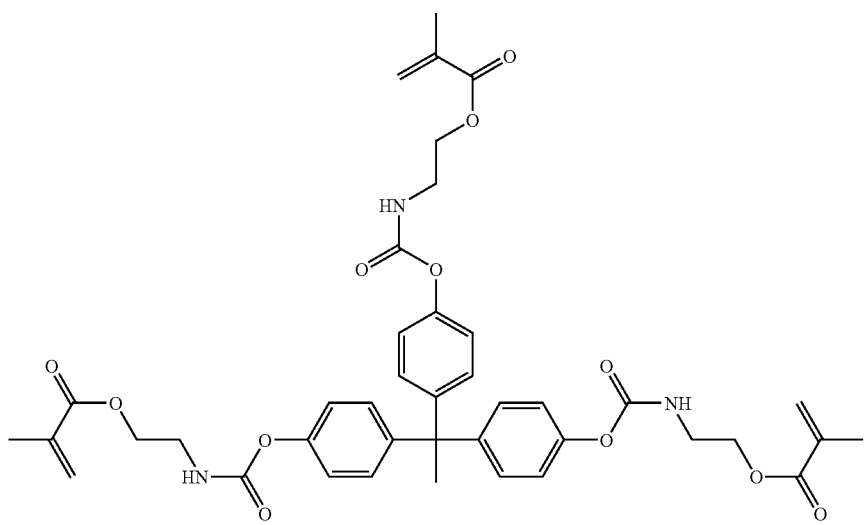

B

Example 4

An adhesive composition is prepared according to the same method as in Example 3 except for including 5 g of the compound of the Chemical Formula B.

Example 5

An adhesive composition is prepared according to the same method as in Example 3 except for including 10 g of the compound of the Chemical Formula B.

Example 6

An adhesive composition is prepared according to the same method as in Example 1 except for including 10 g of the compound of the Chemical Formula C instead of the compound of the Chemical Formula A of Example 1.

Example 6-2-1

Synthesis of a Compound of the Chemical Formula C

In the synthesis of the compound of the Chemical Formula A according to Example 1-2, a compound of the following Chemical Formula C ($^1$H NMR (300 MHz, CDCl$_3$) δ 7.0-7.2 (d 4H), 7.2-7.4 (d 4H), 6.13, 5.59 (s C=CH$_2$), 4.58 (t CH$_2$), 3.15 (t CH$_2$), 2.01 (s CH$_3$), 1.72 (s CH$_3$)) is synthesized according to the same method as in Example 1 except for using bisphenol A instead of tetrakis(p-hydroxyphenyl)methane.

Example 7

An adhesive composition is prepared according to the same method as in Example 1 except for using 10 g of the compound of the Chemical Formula D instead of the compound of the Chemical Formula A of Example 1.

Example 7-2-1

Synthesis of the compound of the Chemical Formula D

In synthesis of the compound of the Chemical Formula A according to Example 1-2, a compound of the following Chemical Formula D ($^1$H NMR (300 MHz, CDCl$_3$) δ 8.08 (t NH), 7.0-7.2 (d 8H), 7.2-7.4 (d 8H), 6.48, 6.40 (s C=CH$_2$), 4.58 (t CH$_2$), 3.15 (t CH$_2$), 2.01 (s CH$_3$)) is synthesized according to the same method as in Example 1 except for using tetrakis(p-hydroxyphenyl)ethene instead of tetrakis(p-hydroxyphenyl)methane.

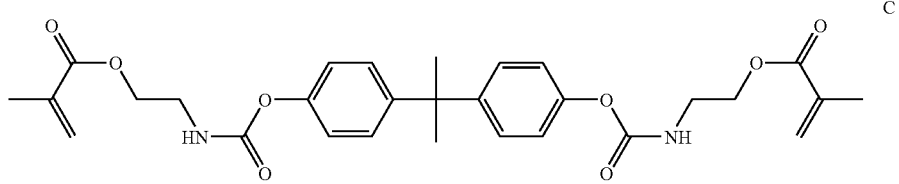

C

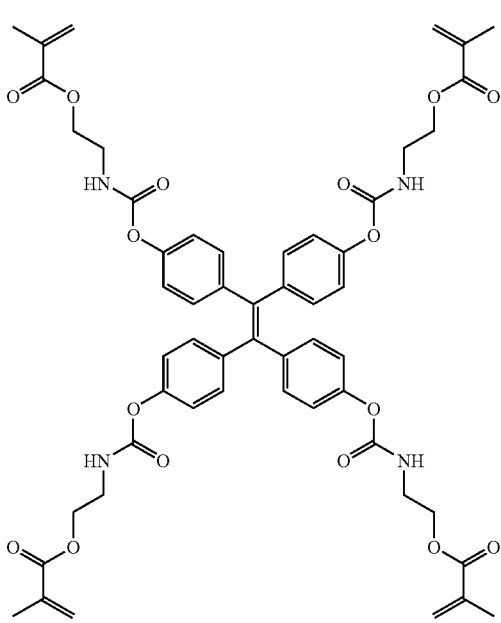

D

Example 8

An adhesive composition is prepared according to the same method as in Example 1 except for using 10 g of the compound of the Chemical Formula E instead of the compound of the Chemical Formula A.

Example 8-2-1

Synthesis of the Compound of the Chemical Formula E

In synthesis of the compound of the Chemical Formula A according to Example 1-2, a compound of the following Chemical Formula E ($^1$H NMR (300 MHz, CDCl$_3$) δ 8.08 (s NH), δ 7.0-7.2 (d 6H), 7.2-7.4 (d 6H), 6.27, 5.59 (s C=CH$_2$), 6.05 (s 6H), 4.71 (s CH$_2$), 2.28 (s CH$_3$), 1.57 (s CH$_3$)) is synthesized according to the same method as in Example 1 except for using 1,1,1-tris (4-hydroxyphenyl)ethane instead of tetrakis(p-hydroxyphenyl)methane and 1,1-bis(acryloyloxymethyl)ethyl isocyanate instead of methacryloyl oxyethyl isocyanate.

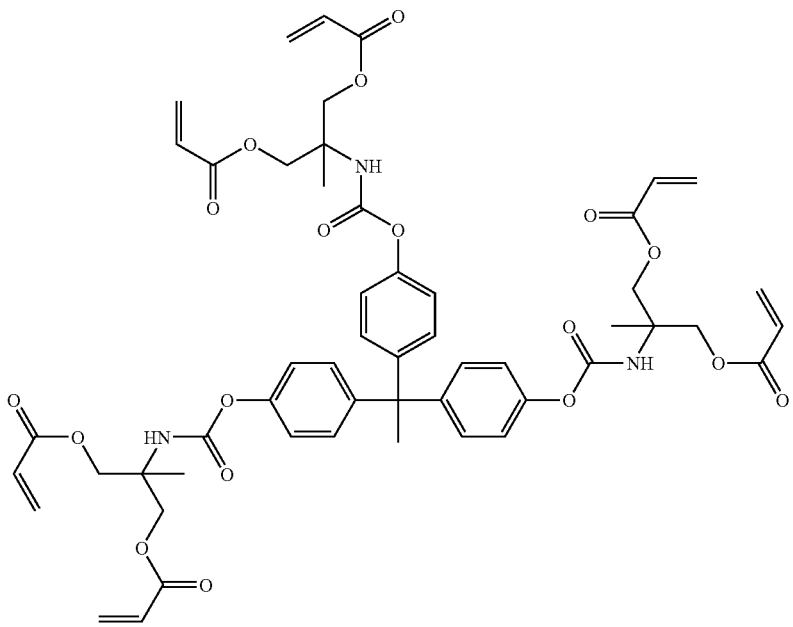

E

Comparative Example 1

An adhesive composition is prepared according to the same method as Example 1 except for using 10 g of 3-functional isocyanate cross-linking agent (AK-75, AeKyeung Chemistry Co.) prepared by reacting trimethylol propane and toluene diisocyanate instead of the compound of the Chemical Formula A.

Comparative Example 2

An adhesive composition is prepared according to the same method as Example 1 except for using the compound of the Chemical Formula A according to Example 1.

Table 1 shows component amounts of the adhesive compositions according to Examples 1 to 8 and Comparative Examples 1 and 2.

TABLE 1

| (unit: g) | Adhesive binder | Compound with urethane (meth)acrylate group | | | | | Cross-linking agent |
|---|---|---|---|---|---|---|---|
| | | Chemical Formula A compound | Chemical Formula B compound | Chemical Formula C compound | Chemical Formula D compound | Chemical Formula E compound | |
| Ex. 1 | 100 | 5 | 0 | 0 | 0 | 0 | 0 |
| Ex. 2 | 100 | 10 | 0 | 0 | 0 | 0 | 0 |
| Ex. 3 | 100 | 0 | 1 | 0 | 0 | 0 | 0 |
| Ex. 4 | 100 | 0 | 5 | 0 | 0 | 0 | 0 |
| Ex. 5 | 100 | 0 | 10 | 0 | 0 | 0 | 0 |
| Ex. 6 | 100 | 0 | 0 | 10 | 0 | 0 | 0 |
| Ex. 7 | 100 | 0 | 0 | 0 | 10 | 0 | 0 |
| Ex. 8 | 100 | 0 | 0 | 0 | 0 | 10 | 0 |
| Comp. Ex. 1 | 100 | 0 | 0 | 0 | 0 | 0 | 10 |
| Comp. Ex. 2 | 100 | 0 | 0 | 0 | 0 | 0 | 0 |

Experimental Example 1

The adhesive compositions according to the examples and comparative examples were subject to experimentation regarding tackiness before and after the photocuring, as well as peel strength.

In order to evaluate properties of the adhesive compositions of Examples 1 to 8 and Comparative Examples 1 and 2, the films made using the adhesive compositions according to Examples 1 to 8 and Comparative Examples 1 and 2 were laminated to be 10 micrometers ("μm") thick and evaluated regarding peel strength before and after the photocuring. The photocuring is performed by exposing them to UV light with intensity of about 300 millijoules per square centimeter ("mJ/cm$^2$") for 2.94 seconds.

The peel strength is measured according to No. 8 of Korean industry standard KS-A-01107 (experiment method of an adhesive tape and an adhesive sheet). The specimens are attached to SUS #304 stainless steel plates, respectively and compressed once back and forth with a 2 kilogram load ("kg-load") roller at a speed of 300 millimeters per minute ("mm/min"). Thirty minutes after the compression, the specimens are turned 180 degrees, are peeled off up to about 25 millimeters ("mm"), and the SUS #304 stainless steel plates are fixed with an upper clip of a tensile strength tester. Then loads are measured when the films are peeled with a tensile speed of 300 mm/min. Table 2 shows the peel strength results before and after the photocuring.

Referring to the peeling data before UV radiation in Table 2, the specimens prepared by using the adhesive compositions of Examples 1 to 8 turned out to have higher load values than those of Comparative Examples 1 and 2, and therefore have excellent tackiness before the UV radiation compared to those of Comparative Examples 1 and 2. On the other hand, the peeling data before UV radiation in Table 2 show that the specimens of Examples 1 to 8 has lower load values for peeling than those of Comparative Examples 1 and 2, and therefore are easily peeled after the UV radiation.

Experimental Example 2

Experimental Example 2 relates to tackiness measurement of photocuring adhesive composition before and after the photocuring.

The specimen of Experimental Example 1 is measured for tackiness before and after the photocuring by using a probe tack tester (tacktoc-2000). The results are provided in the following Table 2. The tackiness is measured by measuring necessary maximum strength when the tip of a clean probe contacts the adhesive films at a speed of 10 mm/sec and with a load of 9.79 kilopascals ("kPa") for 1 second and is separated therefrom, according to ASTM D2979-71.

TABLE 2

| | Peel strength (unit: dyne/25 mm) | | Tackiness (unit: gf) | |
|---|---|---|---|---|
| | Before UV radiation | After UV radiation | Before UV radiation | After UV radiation |
| Example 1 | 9800 | 198 | 126 | 0.32 |
| Example 2 | 10500 | 186 | 132 | 0.28 |
| Example 3 | 9700 | 172 | 106 | 0.34 |
| Example 4 | 7800 | 139 | 118 | 0.33 |
| Example 5 | 9300 | 106 | 114 | 0.18 |
| Example 6 | 7400 | 125 | 109 | 0.25 |
| Example 7 | 7600 | 142 | 121 | 0.21 |
| Comparative Example 1 | 6300 | 236 | 147 | 1.53 |
| Comparative Example 2 | 6800 | 215 | 132 | 1.72 |

As shown in Table 2, the adhesive compositions including the urethane (meth)acrylate group according to Examples 1 to 8 have an excellent peel strength compared with those of Comparative Examples 1 and 2 since they have excellent tackiness before the photocuring and significantly decreased tackiness after the photocuring.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An adhesive composition comprising:
   a compound represented by the following Chemical Formulae 1, a photo polymerization initiator, and a solvent:

[Chemical Formula 1]

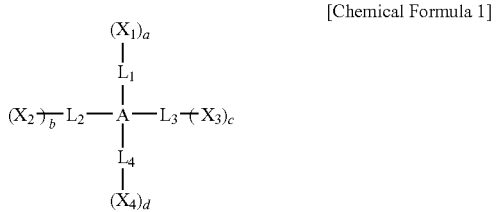

wherein in the above Chemical Formula 1, A is carbon (C) or silicon (Si), $L_1$ to $L_4$ are the same or different and are independently selected from the group consisting of a single bond, a C1 to C20 substituted or unsubstituted alkylene, and a C6 to C20 substituted or unsubstituted arylene, $X_1$ to $X_4$ are the same or different and are independently selected from the group consisting of hydrogen, a C1 to C5 alkyl, substituents represented by the following Chemical Formula 1-1 and substituents represented by the following Chemical Formula 1-2, provided that at least two $X_1$ to $X_4$ are selected from the group consisting of substituents represented by the following Chemical Formula 1-1 or 1-2, and a to d are independently integers of 1 or 2, and when each of a to d is 2, each of $X_1$ to $X_4$ is the same or different,

[Chemical Formula 1-1]

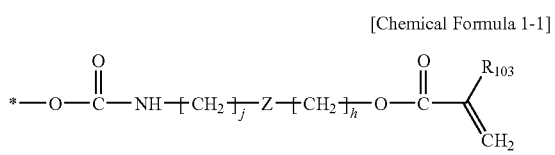

wherein in the above Chemical Formula 1-1, Z is selected from the group consisting of a single bond, —O—, —COO—, and —OCO—, j is an integer ranging from 1 to 5, h is an integer ranging from 0 to 5, and $R_{100}$ is hydrogen or a methyl, provided that when Z is —O—, —COO—, or —OCO—, h is not zero,

[Chemical Formula 1-2]

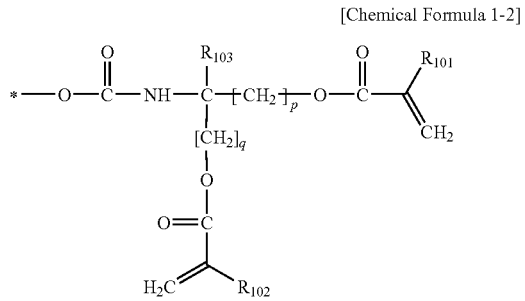

wherein in the above Chemical Formula 1-2, p and q are independently integers ranging from 1 to 5, and $R_{101}$ to $R_{103}$ are independently hydrogen or a methyl.

2. The adhesive composition of claim 1, wherein the compound of Chemical Formula 1 comprises a compound represented by the following Chemical Formulae 1A:

[Chemical Formula 1A]

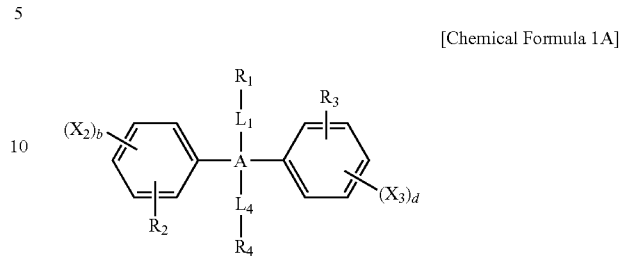

wherein in the above Chemical Formula 1A, A is carbon (C) or silicon (Si), $L_1$ and $L_4$ are the same or different and are independently selected from the group consisting of a single bond, and a C1 to C20 alkylene, $R_1$ to $R_4$ are the same or different and are independently selected from the group consisting of hydrogen, a C1 to C5 alkyl, substituents represented by the above Chemical Formula 1-1 and substituents represented by the above Chemical Formula 1-2, $X_2$ and $X_3$ are independently selected from the group consisting of hydrogen, a C1 to C5 alkyl, substituents represented by the above Chemical Formula 1-1 and substituents represented by the above Chemical Formula 1-2, provided that at least two of $R_1$ to $R_4$, $X_2$ and $X_3$ are selected from the group consisting of substituents represented by the above Chemical Formula 1-1 and substituents represented by the above Chemical Formula 1-2, and b and d are independently integers of 1 or 2, and when b and d are both equal to 2, each of $X_2$ and $X_3$ is the same or different.

3. The adhesive composition of claim 1, wherein the compound of Chemical Formula 1 comprises a compound represented by the following Chemical Formulae 1B:

[Chemical Formula 1B]

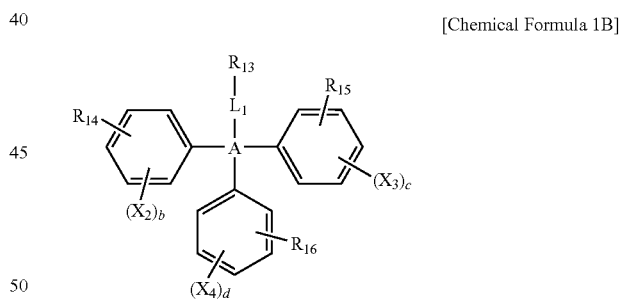

wherein in the above Chemical Formula 1B, A is carbon (C) or silicon (Si), $L_1$ is selected from the group consisting of a single bond and a C1 to C20 alkylene, $R_{13}$ to $R_{16}$ are the same or different and are independently selected from the group consisting of hydrogen, a C1 to C5 alkyl, substituents represented by the above Chemical Formula 1-1 or and substituents represented by the above Chemical Formula 1-2, $X_2$ to $X_4$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{13}$ to $R_{16}$ and $X_2$ to $X_4$ are selected from the group consisting of substituents represented by the above Chemical Formula 1-1 and substituents represented by the above Chemical Formula 1-2, and b to d are independently integers of 1 or 2, and when each of b to d is 2, each of $X_2$ to $X_4$ is the same or different.

4. The adhesive composition of claim 1, wherein the compound of Chemical Formula 1 comprises a compound represented by the following Chemical Formulae 1C:

[Chemical Formula 1C]

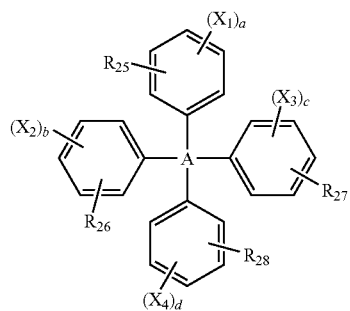

wherein in the above Chemical Formula 1C, A is carbon (C) or silicon (Si), $R_{25}$ to $R_{28}$ are the same or different and are independently selected from the group consisting of hydrogen, a C1 to C5 alkyl, substituents represented by the above Chemical Formula 1-1 and substituents represented by the above Chemical Formula 1-2, $X_1$ to $X_4$ are independently selected from the group consisting of hydrogen, a C1 to C5 alkyl, substituents represented by the above Chemical Formula 1-1 and substituents represented by the above Chemical Formula 1-2, provided that at least two of $R_{25}$ to $R_{28}$ and $X_1$ to $X_4$ are selected from the group consisting of substituents represented by the above Chemical Formula 1-1 and substituents represented by the above Chemical Formula 1-2, and a to d are independently integers of 1 or 2, and when each of a to d is 2, each of $X_1$ to $X_4$ is the same or different.

5. The adhesive composition of claim 1, wherein the compound of Chemical Formula 1 comprises a compound represented by the following Chemical Formulae 1D:

[Chemical Formula 1D]

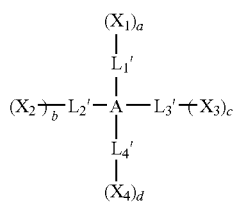

wherein in the above Chemical Formula 1D, A is carbon (C) or silicon (Si), $L_1'$ to $L_4'$ are the same or different and are independently selected from the group consisting of a single bond, and a C1 to C20 substituted or unsubstituted alkylene, $X_1$ to $X_4$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_1$ to $X_4$ are selected from the group consisting of substituents represented by the above Chemical Formula 1-1 and substituents represented by the above Chemical Formula 1-2, and a to d are independently integers of 1 or 2, and when each of a to d is 2, each of $X_1$ to $X_4$ is the same or different.

6. An adhesive composition comprising:
a compound represented by the following Chemical Formula 2, a photopolymerization initiator, and a solvent:

[Chemical Formula 2]

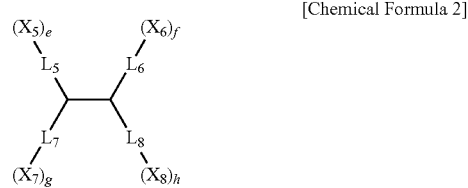

wherein in the above Chemical Formula 2,
$L_5$ to $L_8$ are the same or different and are independently selected from the group consisting of a single bond, a C1 to C20 substituted or unsubstituted alkylene, and a C6 to C20 substituted or unsubstituted arylene, $X_5$ to $X_8$ are the same or different and are independently selected from the group consisting of hydrogen, a C1 to C5 alkyl, substituents represented by the Chemical Formula 1-1 and substituents represented by the Chemical Formula 1-2, provided that at least two of $X_5$ to $X_8$ are selected from the group consisting of substituents represented by the above Chemical Formula 1-1 and substituents represented by the Chemical Formula 1-2, and e to h are independently integers of 1 or 2, and when each of e to h is 2, each of $X_5$ to $X_8$ is the same or different;

[Chemical Formula 1-1]

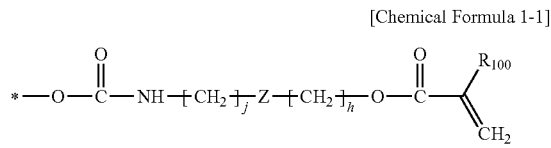

wherein in the above Chemical Formula 1-1, Z is selected from the group consisting of a single bond, —O—, —COO—, and —OCO—, j is an integer ranging from 1 to 5, h is an integer ranging from 0 to 5, and $R_{100}$ is hydrogen or a methyl, provided that when Z is —O—, —COO—, or —OCO—, h is not zero,

[Chemical Formula 1-2]

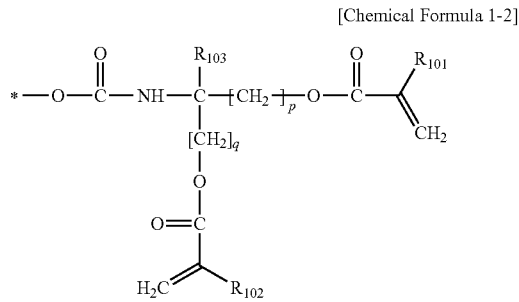

wherein in the above Chemical Formula 1-2, p and q are independently integers ranging from 1 to 5, and $R_{101}$ to $R_{103}$ are independently hydrogen or a methyl.

7. The adhesive composition of claim 6, wherein the compound of Chemical Formula 2 comprises a compound represented by the following Chemical Formulae 2A:

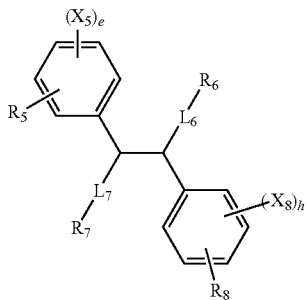

[Chemical Formula 2A]

wherein in the above Chemical Formula 2A, $L_6$ and $L_7$ are the same or different and are independently selected from the group consisting of a single bond, and a C1 to C20 alkylene, $R_5$ to $R_8$ are the same or different and are independently selected from the group consisting of hydrogen, a C1 to C5 alkyl, substituents represented by the above Chemical Formula 1-1 and substituents represented by the above Chemical Formula 1-2, $X_5$ and $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_5$ to $R_8$, and $X_5$ and $X_8$ are selected from the group consisting of substituents represented by the above Chemical Formula 1-1 and substituents represented by the above Chemical Formula 1-2, e and h are independently integers of 1 or 2, and when e and h are both equal to 2, each of $X_5$ and $X_8$ is the same or different.

8. The adhesive composition of claim 6, wherein the compound of Chemical Formula 2 comprises a compound represented by the following Chemical Formulae 2B:

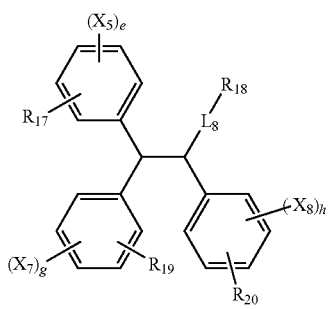

[Chemical Formula 2B]

wherein in the above Chemical Formula 2B, $L_6$ is selected from the group consisting of a single bond and a C1 to C20 alkylene, $R_{17}$ to $R_{20}$ are the same or different and are independently selected from the group consisting of hydrogen, a C1 to C5 alkyl, substituents represented by the above Chemical Formula 1-1 and substituents represented by the above Chemical Formula 1-2, $X_5$, $X_7$, and $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{17}$ to $R_{20}$, $X_5$, $X_7$, and $X_8$ are selected from the group consisting of substituents represented by the above Chemical Formula 1-1 and substituents represented by the above Chemical Formula 1-2, and e, g and h are independently integers of 1 or 2, and when each of e, g and h is 2, each of $X_5$, $X_7$ and $X_8$ is the same or different.

9. The adhesive composition of claim 6, wherein the compound of Chemical Formula 2 comprises a compound represented by the following Chemical Formulae 2C:

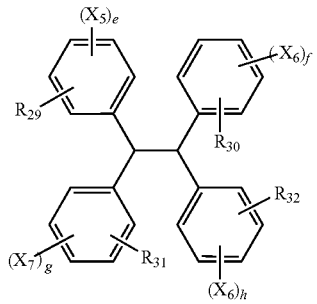

[Chemical Formula 2C]

wherein in the above Chemical Formula 2C, $R_{29}$ to $R_{32}$ are the same or different and are independently selected from the group consisting of hydrogen, a C1 to C5 alkyl, substituents represented by the above Chemical Formula 1-1 and substituents represented by the above Chemical Formula 1-2, $X_5$ to $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{29}$ to $R_{32}$, and $X_5$ to $X_8$ are selected from the group consisting of substituents represented by the above Chemical Formula 1-1 and substituents represented by the above Chemical Formula 1-2, and e to h are independently integers of 1 or 2, and when each of e to h is 2, each of $X_5$ to $X_8$ is the same or different.

10. The adhesive composition of claim 6, wherein the compound of Chemical Formula 2 comprises a compound represented by the following Chemical Formulae 2D:

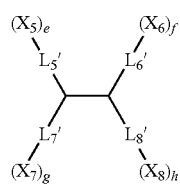

[Chemical Formula 2D]

wherein in the above Chemical Formula 2D, $L_5'$ to $L_8'$ are the same or different and are independently selected from the group consisting of a single bond, and a C1 to C20 substituted or unsubstituted alkylene, $X_5$ to $X_8$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_5$ to $X_8$ are substituents represented by the above Chemical Formula 1-1 and substituents represented by the above Chemical Formula 1-2, and e to h are independently integers of 1 or 2, and when each of e to h is 2, each of $X_5$ to $X_8$ is the same or different.

11. An adhesive composition comprising:
a compound represented by the following Chemical Formula 3, a photopolymerization initiator, and a solvent:

[Chemical Formula 3]

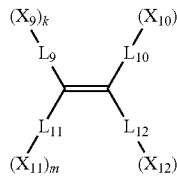

wherein in the above Chemical Formula 3, $L_9$ to $L_{12}$ are the same or different and are independently selected from the group consisting of a single bond, a C1 to C20 substituted or unsubstituted alkylene, and a C6 to C20 substituted or unsubstituted arylene, $X_9$ to $X_{12}$ are the same or different and are independently selected from the group consisting of hydrogen, a C1 to C5 alkyl, substituents represented by the Chemical Formula 1-1 and substituents represented by the above Chemical Formula 1-2, provided that at least two of $X_9$ to $X_{12}$ are selected from the group consisting of substituents represented by the above Chemical Formula 1-1 and substituents represented by the above Chemical Formula 1-2, and k to n are independently integers of 1 or 2, and when each of k to n is 2, each of $X_9$ to $X_{12}$ is the same or different;

[Chemical Formula 1-1]

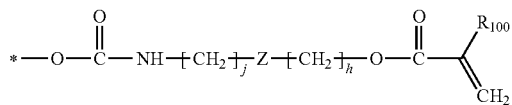

wherein in the above Chemical Formula 1-1, Z is selected from the group consisting of a single bond, —O—, —COO—, and —OCO—, j is an integer ranging from 1 to 5, h is an integer ranging from 0 to 5, and $R_{100}$ is hydrogen or a methyl, provided that when Z is —O—, —COO—, or —OCO—, h is not zero,

[Chemical Formula 1-2]

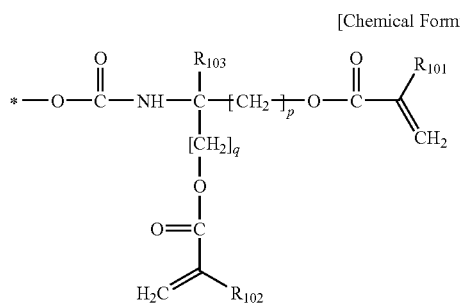

wherein in the above Chemical Formula 1-2, p and q are independently integers ranging from 1 to 5, and $R_{101}$ to $R_{103}$ are independently hydrogen or a methyl.

12. The adhesive composition of claim 11, wherein the compound of Chemical Formula 3 comprises a compound represented by the following Chemical Formulae 3A:

[Chemical Formula 3A]

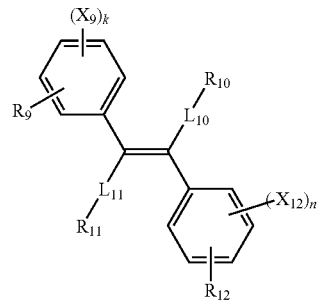

wherein in the above Chemical Formula 3A, $L_{10}$ and $L_{11}$ are the same or different and are independently selected from the group consisting of a single bond, and C1 to C20 alkylene, $R_9$ to $R_{12}$ are the same or different and are independently selected from the group consisting of hydrogen, a C1 to C5 alkyl, substituents represented by the above Chemical Formula 1-1 and substituents represented by the above Chemical Formula 1-2, $X_9$ and $X_{12}$ are independently selected from the group consisting of hydrogen, a C1 to C5 alkyl, substituents represented by the above Chemical Formula 1-1 and substituents represented by the above Chemical Formula 1-2, provided that at least two of $R_9$ to $R_{12}$, $X_9$ and $X_{12}$ are selected from the group consisting of substituents represented by the above Chemical Formula 1-1 and substituents represented by the above Chemical Formula 1-2, k and n are independently integers of 1 or 2, and when k and n are both equal to 2, each of $X_9$ and $X_{12}$ is the same or different.

13. The adhesive composition of claim 11, wherein the compound of Chemical Formula 3 comprises a compound represented by the following Chemical Formulae 3B:

[Chemical Formula 3B]

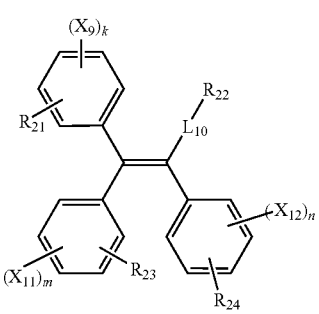

wherein in the above Chemical Formula 3B, $L_{10}$ is selected from the group consisting of a single bond and a C1 to C20 alkylene, $R_{21}$ to $R_{24}$ are the same or different and are independently selected from the group consisting of hydrogen, a C1 to C5 alkyl, substituents represented by the above Chemical Formula 1-1 and substituents represented by the above Chemical Formula 1-2, $X_9$, $X_{11}$, and $X_{12}$ are independently selected from the group consisting of hydrogen, a C1 to C5 alkyl, substituents represented by the above Chemical Formula 1-1 and substituents represented by the above Chemical Formula 1-2, provided that $R_{21}$ to $R_{24}$, $X_9$, $X_{11}$, and $X_{12}$ are selected from the group consisting of substituents represented by the above Chemical Formula 1-1 and substituents represented by the above Chemical Formula 1-2, and k, m, and n are independently integers of 1 or 2, and when k, m, and n are 2, each of $X_9$, $X_{11}$ and $X_{12}$ is the same or different.

14. The adhesive composition of claim 11, wherein the compound of Chemical Formula 3 comprises a compound represented by the following Chemical Formulae 3C:

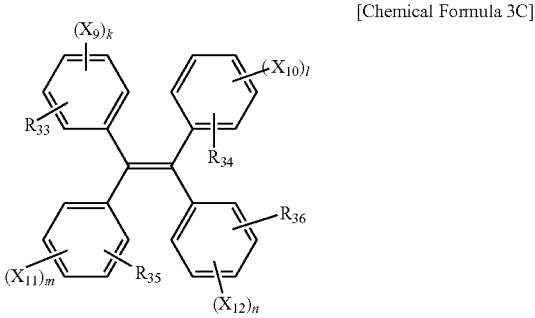

[Chemical Formula 3C]

wherein in the above Chemical Formula 3C, $R_{33}$ to $R_{36}$ are the same or different and are independently selected from the group consisting of hydrogen, a C1 to C5 alkyl, substituents represented by the above Chemical Formula 1-1 and substituents represented by the above Chemical Formula 1-2, $X_9$ to $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $R_{33}$ to $R_{36}$ and $X_9$ to $X_{12}$ are selected from the group consisting of substituents represented by the above Chemical Formula 1-1 and substituents represented by the above Chemical Formula 1-2, and k to n are independently integers of 1 or 2, and when each of k to n is 2, each of $X_9$ to $X_{12}$ is the same or different.

15. The adhesive composition of claim 11, wherein the compound of Chemical Formula 3 comprises a compound represented by the following Chemical Formulae 3D:

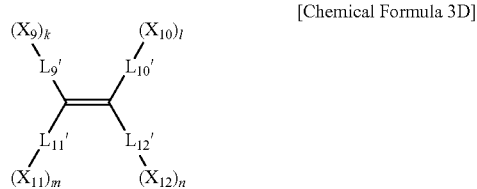

[Chemical Formula 3D]

wherein in the above Chemical Formula 3D, $L_9'$ to $L_{12}'$ are the same or different and are independently selected from the group consisting of a single bond, and a C1 to C20 substituted or unsubstituted alkylene, $X_9$ to $X_{12}$ are the same or different and are independently selected from the group consisting of hydrogen, a C1 to C5 alkyl, substituents represented by the above Chemical Formula 1-1 and substituents represented by the above Chemical Formula 1-2, provided that at least two of $X_9$ to $X_{12}$ are selected from the group consisting of substituents represented by the above Chemical Formula 1-1 and substituents represented by the above Chemical Formula 1-2, and k to n are independently integers of 1 or 2, and when each of k to n is 2, each of $X_9$ to $X_{12}$ is the same or different.

16. The adhesive composition of claim 1, wherein the photopolymerization initiator is selected from the group consisting of α-hydroxy ketone, benzyl ketal, benzyldimethylketal, benzophenone, acetophenone, benzoin, benzoinmethylether, benzomethylether, benzoinbenzoic acid, methylbenzoinbenzoate, 2,4-diethylthioxanthone, 1-hydroxy cyclohexylphenyl ketone, benzyldiphenyl sulfide, tetramethyl thiuram monosulfide, 2,2-dimethoxy-2-phenyl acetophenone, and a combination thereof.

17. The adhesive composition of claim 1, wherein the adhesive composition further comprises a binder.

18. The adhesive composition of claim 17, wherein the adhesive binder is selected from the group consisting of a polyester-based binder, an urethane-based binder, a silicon-based binder, a natural rubber-based binder, an acryl-based binder, and a combination thereof.

19. The adhesive composition of claim 1, wherein at least three of $X_1$ to $X_4$ in the Chemical Formula 1 are selected from the group consisting of substituents represented by Chemical Formula 1-1 and substituents represented by Chemical Formula 1-2.

20. The adhesive composition of claim 6, wherein at least three of $X_5$ to $X_8$ in the Chemical Formula 2 are selected from the group consisting of substituents represented by Chemical Formula 1-1 and substituents represented by Chemical Formula 1-2.

21. The adhesive composition of claim 11, wherein at least three of $X_9$ to $X_{12}$ in the Chemical Formula 3 are selected from the group consisting of substituents represented by Chemical Formula 1-1 and substituents represented by Chemical Formula 1-2.

22. An adhesive film obtained by photocuring the adhesive composition according to claim 1.

23. An adhesive film obtained by photocuring the adhesive composition according to claim 6.

24. An adhesive film obtained by photocuring the adhesive composition according to claim 11.

* * * * *